United States Patent [19]
Ozden et al.

[11] Patent Number: 6,012,080
[45] Date of Patent: Jan. 4, 2000

[54] METHOD AND APPARATUS FOR PROVIDING ENHANCED PAY PER VIEW IN A VIDEO SERVER

[75] Inventors: Banu Ozden, Summit; Rajeev Rastogi, New Providence; Abraham Silberschatz, Summit, all of N.J.

[73] Assignee: Lucent Technologies Inc., Murray Hill, N.J.

[21] Appl. No.: 08/624,013

[22] Filed: Mar. 27, 1996

[51] Int. Cl.[7] .................................................... G06F 9/46
[52] U.S. Cl. ............................................................ 709/102
[58] Field of Search .................................. 395/670, 671, 395/672, 673; 709/102, 103, 105

[56] References Cited

U.S. PATENT DOCUMENTS 5,606,695  2/1997  Dworzecki ............................. 395/208

OTHER PUBLICATIONS

Ho et al, Real–Time Scheduling of Multiple Segment Tasks, Compsac 1990.
Yvan et al, A Decomposition Approach To Non–Preemptive Scheduling In Hard Real–Time Systems, Real Time Systems, Symposium, 1989.
Saksena et al, Temporal Analysis For Hard Real–Time Scheduling Computers & Comm. Conf., 1993.
Yv et al, Scheduling Parallelizable Imprecise Computations On Multiprocessors, Parallel Processing Symp., 1991.

Primary Examiner—Lucien U. Toplu

[57] ABSTRACT

A method and an apparatus are disclosed for providing enhanced pay per view in a video server. Specifically, the present invention periodically schedules a group of non pre-emptible tasks corresponding to videos in a video server having a predetermined number of processors, wherein each task is defined by a computation time and a period. To schedule the group of tasks, the present invention divides the tasks into two groups according to whether they may be scheduled on less than one processor. The present invention schedules each group separately. For the group of tasks scheduleable on less than one processor, the present invention conducts a first determination of scheduleability. If the first determination of scheduleability deems the group of tasks not scheduleable, then the present invention conducts a second determination of scheduleability. If the second determination of scheduleability also deems the group of tasks not scheduleable, then the present invention recursively partitions the group of tasks in subsets and re-performs the second determination of scheduleability. Recursive partitioning continues until the group of tasks is deemed scheduleable or no longer partitionable. In the latter case, the group of tasks is deemed not scheduleable.

29 Claims, 27 Drawing Sheets

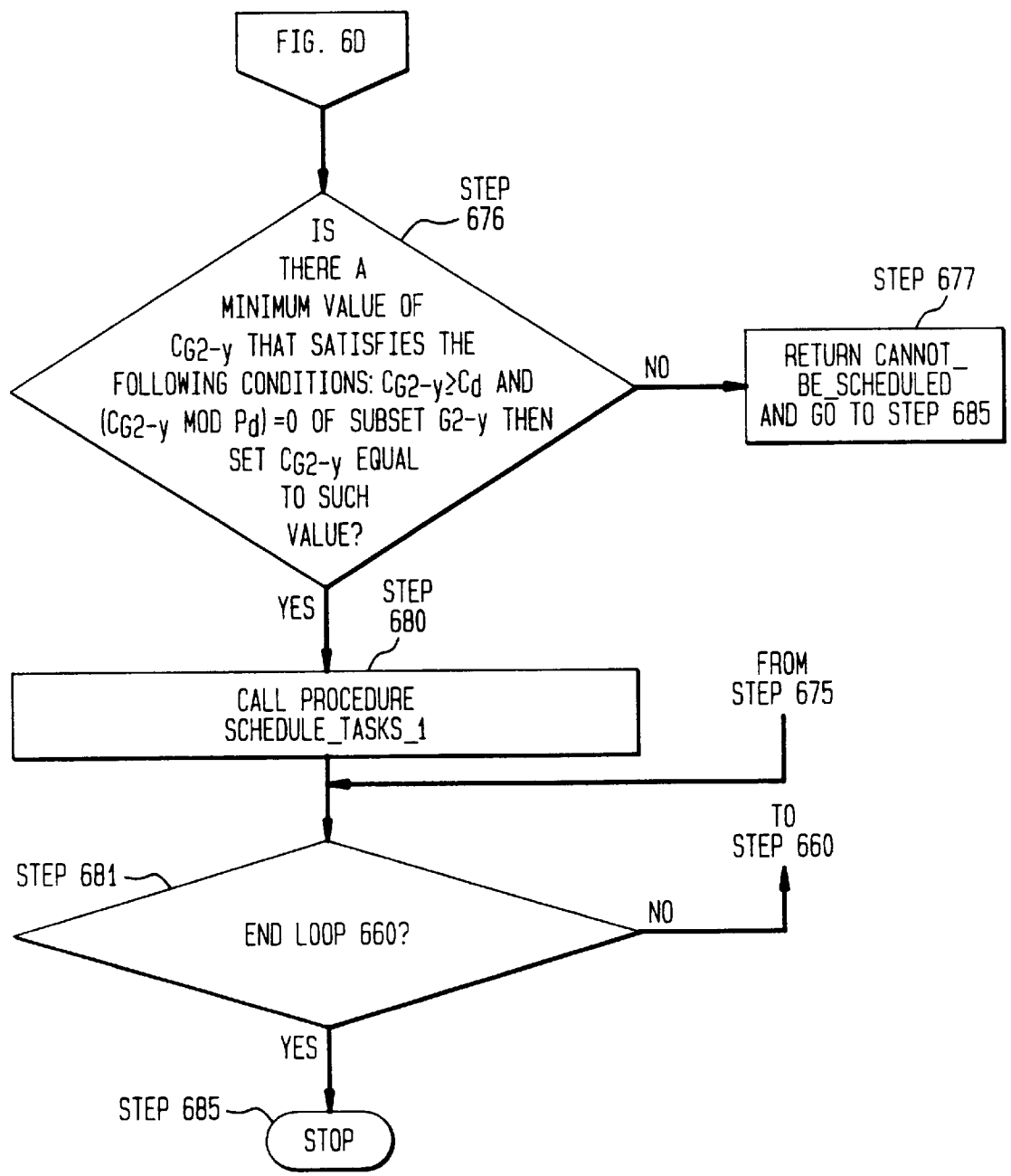

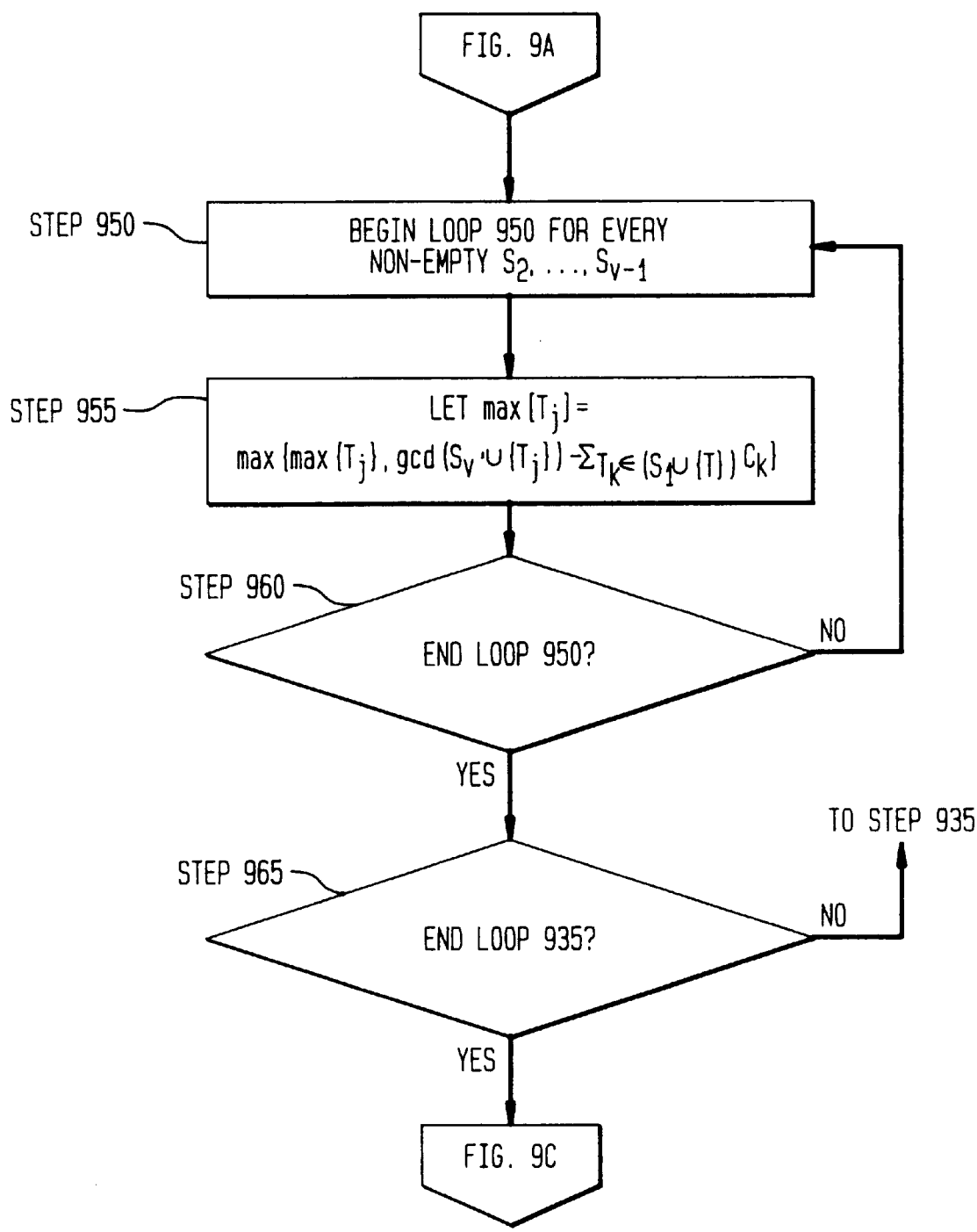

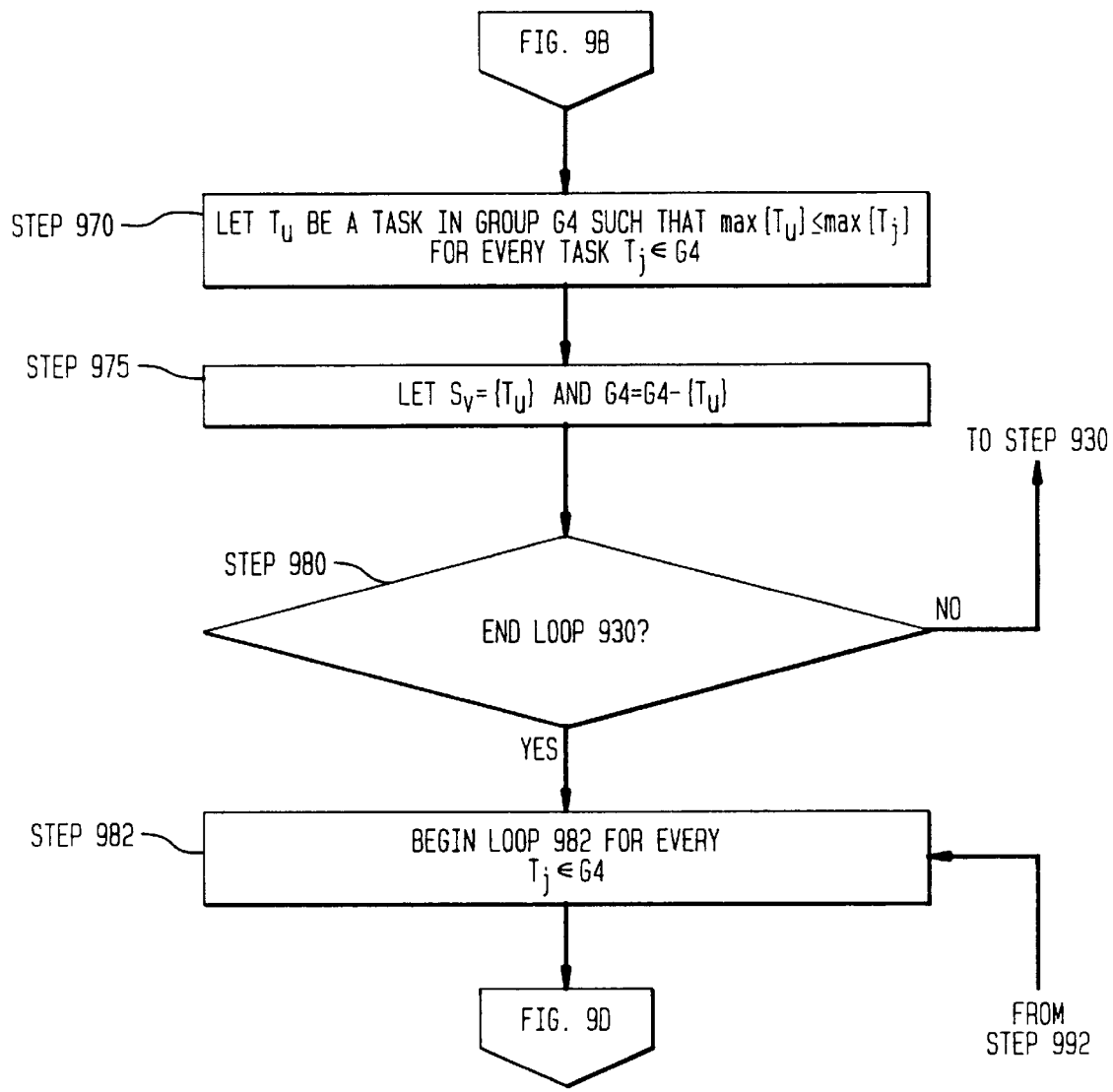

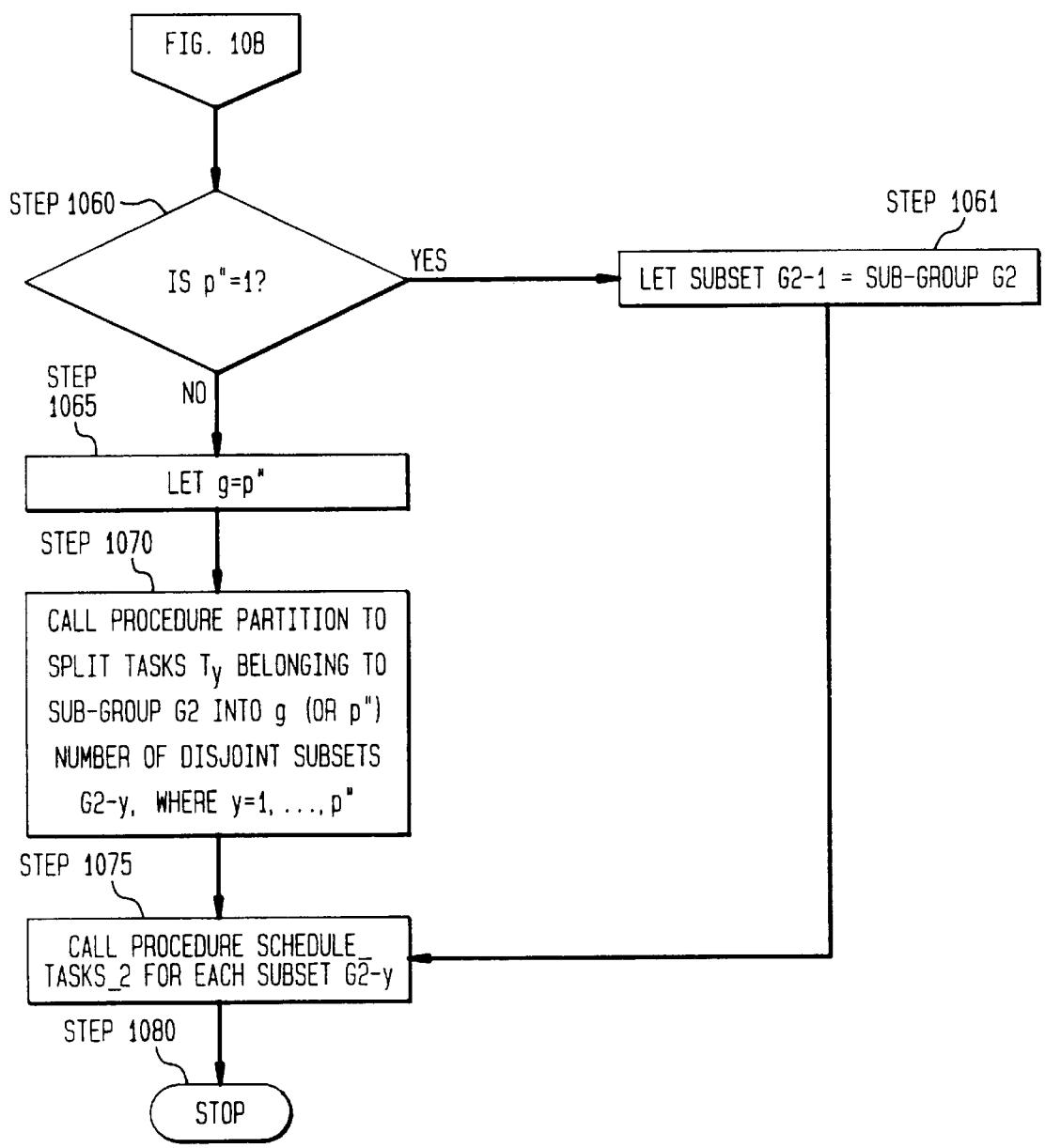

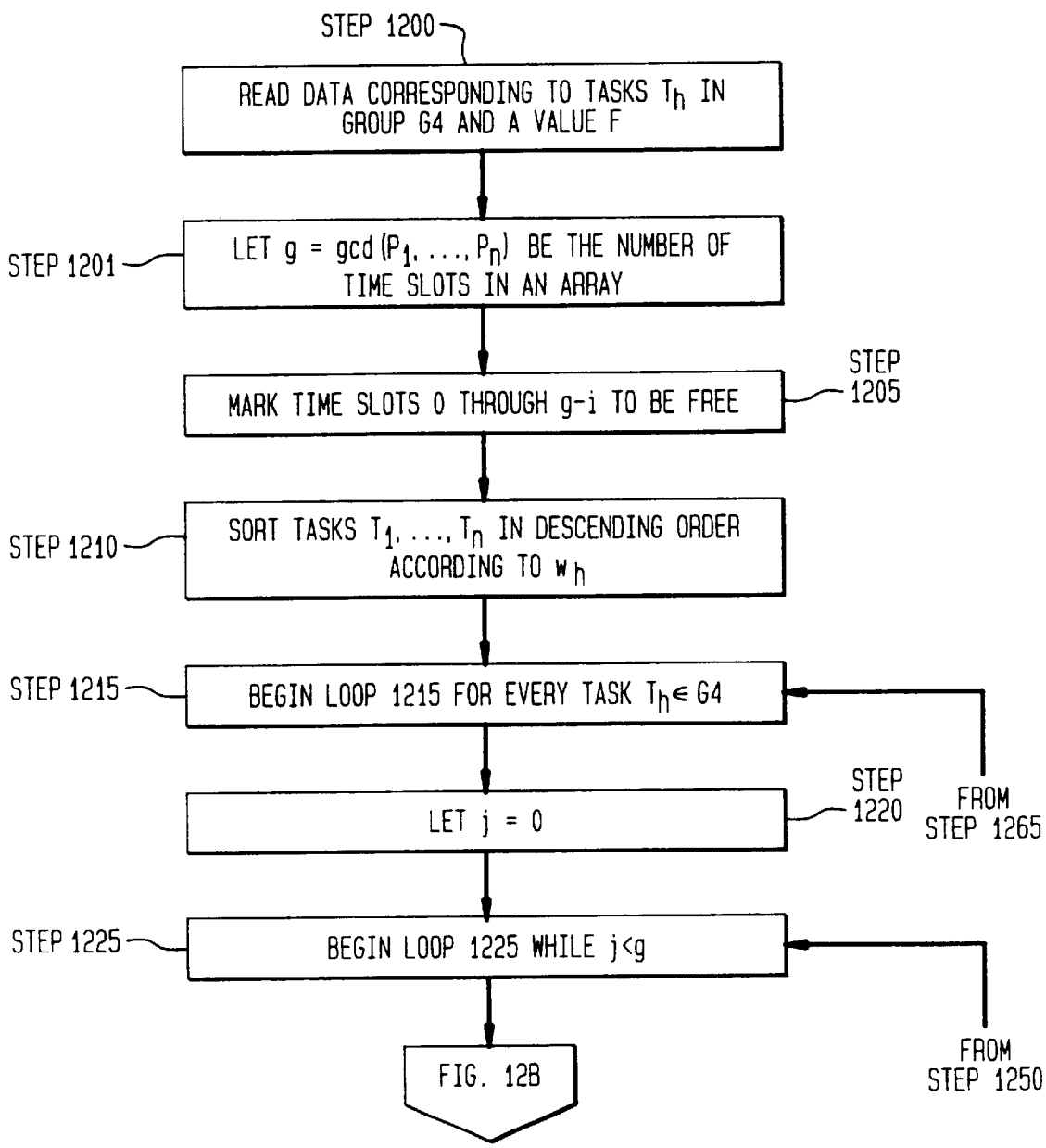

METHOD AND APPARATUS FOR PROVIDING ENHANCED PAY PER VIEW IN A VIDEO SERVER

RELATED APPLICATIONS

The subject matter of this application is related to U.S. patent application Ser. No. 08/624,011, entitled "Method and Apparatus for Providing Enhanced Pay Per View in a Video Server Employing a Coarse-Grained Striping Scheme" filed concurrently herewith. The subject matter of this application is also related to the U.S. patent application Ser. No. 08/492,315, entitled "Coarse-Grained Disk Striping Method For Use In Video Server Environments", each of the above applications having at least one common inventor and a common assignee, the subject matter of each application being incorporated by reference herein.

FIELD OF THE INVENTION

The present invention relates generally to the field of video-on-demand services, and more particularly to video servers employing disk stripping methodology.

BACKGROUND OF THE INVENTION

In recent years, significant advances in both networking technology and technologies involving the digitization and compression of video have taken place. For example, it is now possible to transmit several gigabits of data per second over fiber optic networks and with compression standards like MPEG-1, the bandwidth required for transmitting video is relatively low. These advances have resulted in a host of new applications involving the transmission of video data over communications networks, such as video-on-demand, on-line tutorials, interactive television, etc.

Video servers are one of the key components necessary to provide the above applications. Depending on the application, the video servers may be required to store hundreds of video programs and concurrently transmit data for a few hundred to a few thousand videos to clients. As would be understood, the transmission rate is typically a fixed rate contingent upon the compression technique employed by the video server. For example, the transmission rate for MPEG-1 is approximately 1.5 Mbps.

Videos, for example movies and other on-demand programming, are transmitted from the random access memory (RAM) of the video server to the clients. However, due to the voluminous nature of video data (e.g., a hundred minute long MPEG-1 video requires approximately 1.125 GB of storage space) and the relatively high cost of RAM, storing videos in RAM is prohibitively expensive. A cost effective alternative manner for storing videos on a video server involves utilizing magnetic or optical disks instead of RAM. Video stored on disks, however, needs to be retrieved into RAM before it can be transmitted to the clients by the video server. Modem magnetic and optical disks, however, have limited storage capacity, e.g., 1 GB to 9 GB, and relatively low transfer rates for retrieving data from these disks to RAM, e.g., 30 Mbps to 60 Mbps. This limited storage capacity affects the number of videos that can be stored on the video server and, along with the low transfer rates, affects the number of videos that can be concurrently retrieved.

A naive storage scheme in which an entire video is stored on an arbitrarily chosen disk could result in disks with popular video programming being over-burdened with more requests than can be supported, while other disks with less popular video programs remain idle. Such a scheme results in an ineffective utilization of disk bandwidth. As would be understood, the term "disk bandwidth" refers to the amount of data which can be retrieved from a disk over a period of time. When data is not being retrieved from a disk, such as when the disk is idle or when a disk head is being positioned, disk bandwidth is not being utilized, and is thus considered wasted. Ineffective utilization of disk bandwidth adversely affects the number of concurrent streams a video server can support.

To utilize disk bandwidth more effectively, various schemes have been devised where the workload is distributed uniformly across multiple disks, i.e., videos are laid out on more than one disk. One popular method for storing videos across a plurality of disks is disk striping, a well known technique in which consecutive logical data units (referred to herein as "stripe units") are distributed across a plurality of individually accessible disks in a round-robin fashion. Disk striping, in addition to distributing the workload uniformly across disks, also enables multiple concurrent streams of a video to be supported without having to replicate the video.

Outstanding requests for videos are generally serviced by the video server in the order in which they were received, i.e., first-in-first-out (FIFO). Where the number of concurrent requests is less than or not much greater than the number of concurrent streams that can be supported by the server, good overall response times to all outstanding requests are possible. In video-on-demand (VOD) environments, however, where the number concurrent requests, typically, far exceeds the number of concurrent streams that can be supported by the server, good overall response times are not possible for all outstanding requests using FIFO.

To provide better overall response times, a paradigm known as enhanced pay-per-view (EPPV) was adopted by VOD environments, such as cable and broadcasting companies. Utilizing the enhanced pay per view paradigm, video servers retrieve and transmit video streams to clients at fixed intervals or periods. Under this paradigm, the average response time for a request is half of the fixed interval and the worst case response time for a request would be the fixed interval. Furthermore, by retrieving popular videos more frequently, and less popular video less frequently, better overall average response times could be achieved. Finally, by informing the clients about the periods and the exact times at which videos are retrieved, zero response times can be provided.

Although a set of videos are scheduleable on a video server employing the EPPV paradigm, determining an exact schedule for which new streams of videos are to begin can be difficult, particularly when the periods and computation times, i.e., time required to transmit a video or segment, are arbitrary. The goal is to schedule the set of videos such that the number of streams scheduled to be transmitted concurrently does not exceed the maximum number of concurrent streams supportable by the video server. The complexity of scheduling videos in an EPPV paradigm is NP-hard—wherein the complexity of scheduling periodic videos increases exponentially as the number of videos being scheduled and the number of processors by which the videos are transmitted increases. Accordingly, there is a need for a method and apparatus which can effectively schedule videos periodically on a video server employing the EPPV paradigm.

SUMMARY OF THE INVENTION

The present invention sets forth a method for providing enhanced pay per view in a video server. Specifically, the present method periodically schedules a group G of non pre-emptible tasks $T_i$ corresponding to videos in a video server having p number of processors, wherein each task $T_i$ has a computation time $C_i$ and a period $P_i$. Three procedures are utilized by the present invention to schedule the tasks $T_i$ in group G. The first procedure splits the group G of tasks $T_i$ into two sub-groups G1 and G2 according to whether the tasks are scheduleable on less than one processor. A task is scheduleable on less than one processor if one or more other tasks may be scheduled with it on the same processor.

The first procedure subsequently attempts to schedule both sub-groups separately. For the sub-group of tasks not scheduleable on less than one processor, i.e., sub-group G1, the first procedure schedules such tasks on p' number of processors. Note that p=p'+p". For the sub-group of tasks scheduleable on less than one processor, i.e., sub-group G2, the first procedure calls upon a second procedure to further split the sub-group G2 into p" number of subsets G2-y such that there is one subset G2-y for each of the remaining p" number of processors. Subsequently, the first procedure makes a first determination whether each subset G2-y is scheduleable on one processor. If a subset G2-y is scheduleable on one processor, the first procedure schedules the tasks in the subset G2-y.

Otherwise the first procedure calls upon a third procedure to make a second determination of scheduleability for the subsets G2-y which were determined not to be scheduleable by the first determination. If the third procedure determines that a subset is not scheduleable and that such subset can be further partitioned, then the third procedure calls upon the second procedure to further divide the subset G2-y into sub-subsets $S_v$.

After a subset G2-y has been divided into sub-subsets $S_v$, the third procedure calls itself to re-make the second determination of scheduleability for every sub-subset $S_v$ belonging to the partitioned subset G2-y. This technique is known as recursive partitioning. The present method will continue to recursively partition a sub-group, subset, sub-subset, etc. of tasks until the present method determines whether the sub-group, subset, sub-subset, etc. of tasks is scheduleable or not partitionable any further. In the case of the latter determination, the present invention determines the group G of tasks $T_i$ is not scheduleable on the video server with the current computation times $C_i$ and periods $P_i$.

BRIEF DESCRIPTION OF THE DRAWINGS

For a better understanding of the present invention, reference may be had to the following description of exemplary embodiments thereof, considered in conjunction with the accompanying drawings, in which:

FIGS. 6a to 6e depict an exemplary flowchart of a procedure for scheduling tasks with computation times $C_i$ and periods $P_i$ in a video server;

FIGS. 9a to 9d depict an exemplary flowchart of a procedure for partitioning a group of tasks;

FIGS. 10a to 10c depict an exemplary flowchart of a procedure for scheduling tasks having sub-tasks, each of unit computation time, at periods $P_h$ and an interval F;

FIGS. 12a to 12c depict an exemplary flowchart of a procedure for determining scheduleability of tasks in FIGS. 10a to 10c using an array of time slots.

DETAILED DESCRIPTION

Figure 1:
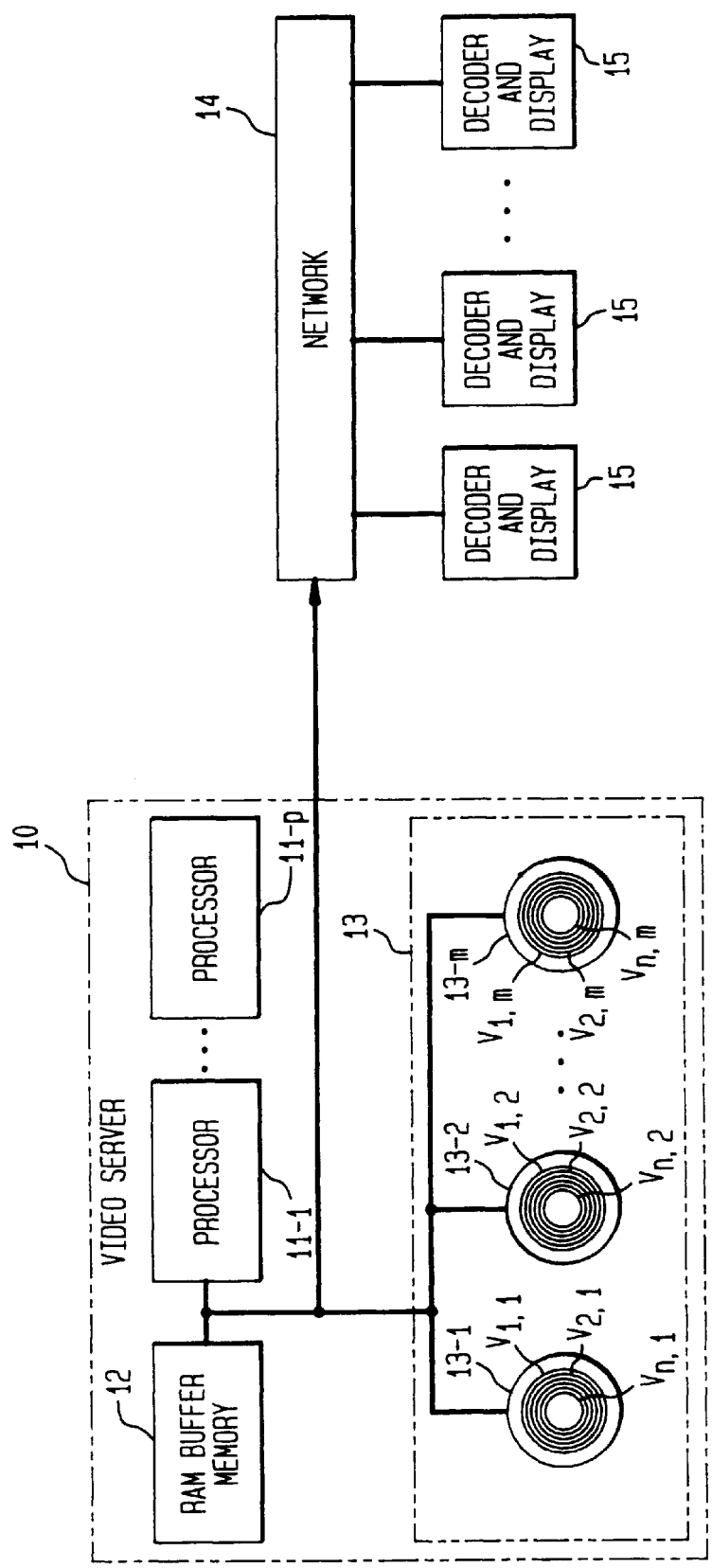
FIG. 1 depicts a video server for providing video-on-demand (also referred to herein as "VOD") services in accordance with the present invention.

Referring to FIG. 1, there is illustrated a video server 10 for providing video-on-demand (VOD) services in accordance with the present invention. The video server 10 is a computer system comprising processors 11-1 to 11-p, a RAM buffer memory 12 of size D and a data storage unit 13. The data storage unit 13 comprises a plurality of disks 13-1 to 13-m for the storage of videos $V_i$, where i=1, . . . ,N denotes a specific video (program), or a group of concatenated videos $V_i$ (hereinafter referred to as a "super-video $\hat{V}_h$", where h=1, . . . ,P denotes a specific super-video), which are preferably in compressed form. The data storage unit 13 further comprises m disk heads (not shown) for retrieving the videos $V_i$ from the disks 13-1 to 13-m to the RAM buffer memory 12. Note that the value of p, which is the number of processors, depends on the size D of the RAM buffer memory, the m number of disks and the amount of data that is being retrieved. The manner in which the value of p is determined will be described herein.

The processors 11-1 to 11-p are operative to transmit the videos $V_i$ across a high-speed network 14 at a predetermined rate, denoted herein as $r_{disp}$, to one or more recipients or clients 15. However, before the videos $V_i$ can be transmitted, the videos $V_i$ must first be retrieved from the disks 13-1 to 13-m into the RAM buffer memory 12 (from which the videos $V_i$ are eventually transmitted). The continuous transfer of a video $V_i$ from disks 13-1 to 13-m to the RAM buffer memory 12 (or from the RAM buffer memory 12 to the clients) at the rate $r_{disp}$ is referred to herein as a stream. The number of videos $V_i$ that can be retrieved concurrently from the disks 13-1 to 13-m, i.e., concurrent streams, is limited by the size D of the RAM buffer memory 12—the RAM buffer memory size is directly proportional to the number of retrievable concurrent streams.

Video servers operative to retrieve or support a large number of concurrent streams provide better overall response times to video requests by clients. Ideally, a video server would have a RAM buffer memory of sufficient size D to support every concurrent client request immediately upon receipt of the request. In such an ideal situation, the video server is described as having zero response times to client requests. However, in VOD environments, where the number of concurrent requests per video server are large, the size of the RAM buffer memory required to service the requests immediately would impose a prohibitively high cost on the video server. In such an environment, the number of requests far exceeds the capacity of the video server to transmit concurrent streams, thus adversely affecting overall response times. To provide better overall response times, VOD environments such as cable and broadcast companies adopted a very effective paradigm, known as enhanced pay per view or EPPV, for retrieving and transmitting videos $V_i$ to clients periodically.

Enhanced Pay Per View

Enhanced pay per view involves retrieving and transmitting new streams of video $V_i$ to clients at a period $P_i$, where $P_1$ is expressed in terms of time intervals referred to as rounds. For example, starting with a certain round $r_i$, data retrieval for new streams of video $V_i$ is begun during rounds $r_i$, $r_i+P_i$, $r_i+2\cdot P_i$, etc. However, depending on the period $P_1$ and the size of the available RAM buffer memory, it may not always be possible to retrieve data for the videos $V_i$ at period $P_i$. The problem of determining whether videos may be retrieved periodically by a video server is the same as scheduling periodic tasks, denoted herein as $T_i$, on a multiprocessor. See J. A. Stankovic and K. Ramamritham, "Hard Real-Time Systems" published in *IEEE Computer Society Press*, Los Alamitos, Calif., 1988. For the purposes of this application, a task $T_i$ (or task $\hat{T}_h$) corresponds to the job of retrieving all data belonging to a stream of video $V_i$ (or super-video $\hat{V}_h$) on a single disk.

Note that EPPV may be unsuitable for environments in which the number of concurrent requests is not much larger than the number of concurrent streams supportable by the video server, and in which the requested videos are random, making it difficult to determine periods for the various videos.

Disk Striping

Figure 2:
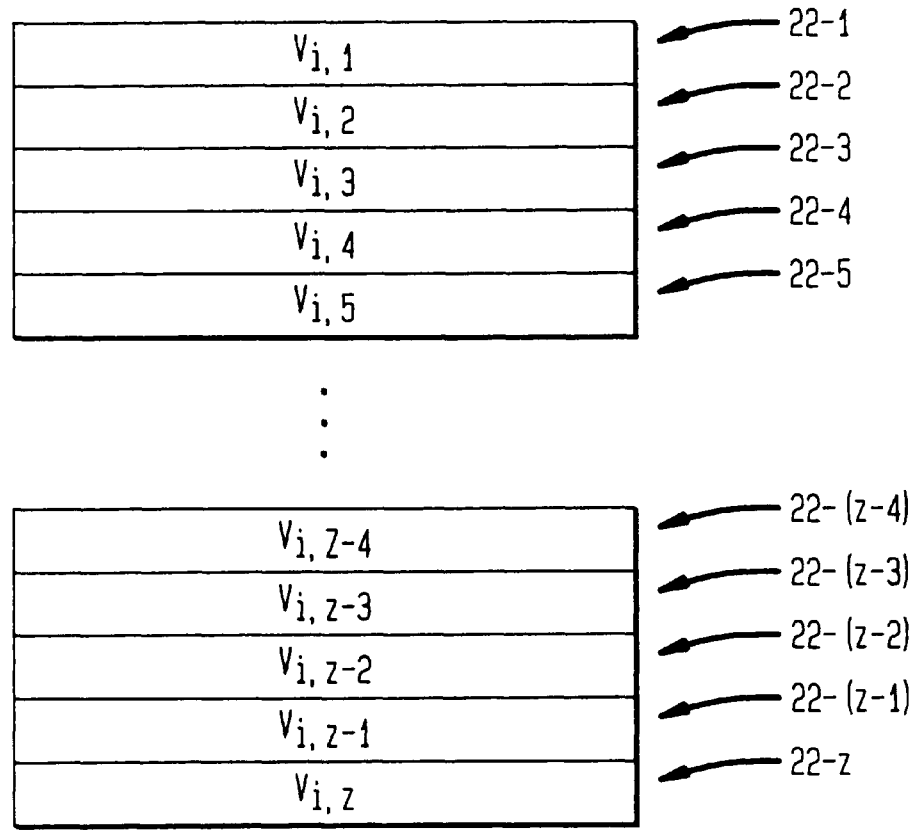
FIG. 2 depicts an exemplary illustration of disk striping.

In accordance with the present invention, a novel method and apparatus is disclosed for providing enhanced pay per view in a video server employing a disk striping scheme. Disk striping involves spreading a video over multiple disks such that disk bandwidth is utilized more effectively. Specifically, disk striping is a technique in which consecutive logical data units (referred to herein as "stripe units") are distributed across a plurality of individually accessible disks in a round-robin fashion. Referring to FIG. 2, there is shown an exemplary illustration depicting a disk striping methodology. As shown in FIG. 2, a video 20 is divided into z number of stripe units 22-1 to 22-z of size su. Each stripe unit is denoted herein as $V_{ij}$, where j=1, . . . ,z denotes a specific stripe unit of video $V_i$.

For illustration purposes, the present invention will be described with reference to particular fine-grained and coarse-grained disk striping schemes disclosed in a related patent application, U.S. Ser. No. 08/492,315 entitled "Coarsed-Grain Disk Striping Method For Use In Video Server." However, this should not be construed to limit the present invention to the aforementioned particular disk striping schemes in any manner.

Fine-Grained Striping Scheme

Figure 3:
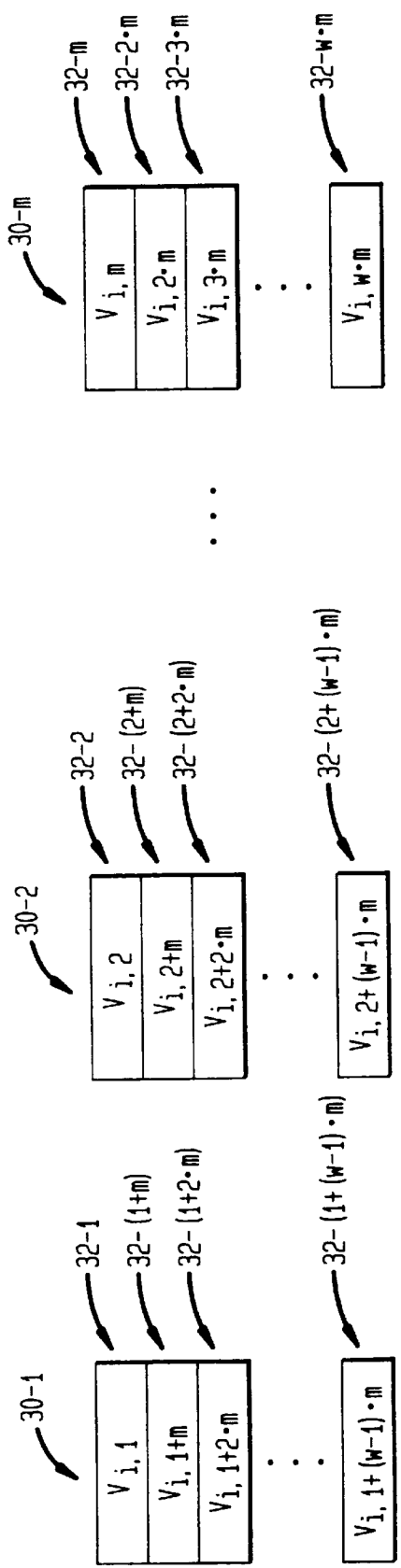
FIG. 3 depicts an exemplary fine-grained striping scheme for storing and retrieving videos $V_i$.

Referring to FIG. 3, there is illustrated an exemplary fine-grained striping scheme for storing and retrieving videos $V_i$. In this fine-grained striping scheme ("FGS scheme"), as shown in FIG. 3, stripe units $V_{ij}$ 32-1 to 32-m belonging to one or more videos $V_i$ are stored contiguously on disks 30-1 to 30-m in a round-robin fashion—stripe units $V_{i,1}$ to $V_{i,m}$ are stored on disks 30-1 to 30-m, respectively, stripe units $V_{i,1+m}$ to $V_{i,2\cdot m}$ are stored on disks 30-1 to 30-m, respectively, etc. Each group of m number of consecutive stripe units $V_{ij}$ are stored in the same relative position on their respective disks—for example, stripe units $V_{i,1}$ to $V_{i,m}$ are stored on the first track of disks 30-1 to 30-m, respectively, stripe units $V_{i,1+m}$ to $V_{i,2\cdot m}$ are stored on the second track of disks 30-1 to 30-m, respectively, etc. Each video $V_i$ preferably has a length $l_i$ which is a multiple of m such that, for each disk 30-1 to 30-m, the number of stripe units belonging to the same video $V_i$, denoted herein as $w_i$, is the same for each disk. This can be achieved by appending advertisements or padding videos at the end. The group of stripe units on a disk belonging to the same video is referred to herein as a block, thus each block has $w_i$ stripe units belonging to the video $V_i$.

In this striping scheme, data for each stream of video $V_i$ is retrieved from disks 13-1 to 13-m using all m disk heads simultaneously. Specifically, each disk head retrieves a stripe unit of size su from the same relative position on their respective disks for each stream over a series of rounds denoted herein as $r_i$. Thus, the amount of data retrieved during a round $r_i$ for each stream constitutes a group of m number of consecutive stripe units belonging to the video $V_i$. Each group of m number of stripe units constitutes a size d portion of the video $V_i$—in other words, m·su=d. Note that the number of rounds for which data is retrieved for a stream of video $V_i$ is $\lceil l_i/d \rceil$, where $l_i$, corresponds to the length of video $V_i$. Accordingly, each stream of video $V_i$ can be viewed as comprising $\lceil l_i/d \rceil$ number of size d portions.

When data retrieval is begun for a new stream of video $V_i$, a buffer of size 2·d is allocated. This allows size d portions of each new stream to be retrieved and transmitted concurrently. Note however that data transmission for a new stream does not begin until the entire first size d portion of the video $V_i$ is retrieved into the allocated buffer. For example, if round $1_i$ is the time interval in which the first size d portion of a video $V_i$ is retrieved into the allocated buffer, then transmission to the clients of the first size d portion at the rate $r_{disp}$ is not begun until round $2_i$. The time it takes to transmit a size d portion of data corresponds to the duration of the round $r_i$—in other words, the time interval of round $r_i$ is $d/r_{disp}$. Additionally, in round $2_i$, during the transmission of the first size d portion of video $V_i$, the second size d portion of video $V_i$ is being retrieved into the allocated buffer.

Generally, for each round $r_i$, the next size d portion of a video $V_i$ is retrieved into the allocated buffer and the preceding size d portion of the same video $V_i$, which is currently residing in the allocated buffer, is transmitted from the allocated buffer. This action of simultaneously retrieving and transmitting size d portions of data continues uninterrupted until the entire video $V_i$ is retrieved and transmitted. Note that data retrieval of the next size d portion of video $V_i$ must be completed at the same time or before transmission of the preceding size d portion of video $V_i$ is completed— i.e., the time to retrieve a size d portion must be equal to or less than the time to transmit a size d portion. In other words, data retrieval must be completed with the round $r_i$. The reason for this requirement is the need to ensure that data for every video is transmitted to the clients as a continuous stream at the rate $r_{disp}$. Failure to complete data retrieval within each round $r_i$ could result in an interruption in the video stream.

The size increments at which data is being retrieved for each stream of video $V_i$ is uniform, i.e., value of d, and is preferably computed based on the size D of the RAM buffer memory and the m number of disks on which the video $V_i$ is striped across such that the number of concurrent streams that can be supported by the video server is maximized. For the present FGS scheme, the value of d is $\lceil d_{calc}/\text{m·su}$ if $$\left\lceil \frac{d_{calc}}{m \cdot su} \right\rceil \text{ if } \frac{D}{2 \cdot \left\lceil \frac{d_{calc}}{m \cdot su} \right\rceil \cdot m \cdot su} \text{ is greater than } \frac{\frac{d}{r_{disp}} - 2 \cdot t_{seek}}{\frac{d}{m \cdot r_{disk}} + t_{rot} + t_{settle}},$$

where $$d_{calc} = \frac{r_{disp}}{4} \cdot \left( 4 \cdot t_{seek} + \frac{D}{m \cdot r_{disk}} + \sqrt{\left(4 \cdot t_{seek} + \frac{D}{m \cdot r_{seek}}\right)^2 + \frac{8 \cdot D \cdot (t_{rot} + t_{settle})}{r_{disp}}} \right)$$

is the maximum value of d, $t_{seek}$ is the time it takes for a disk head to be positioned on the track containing the data, $t_{rot}$ is the time it takes the disk to rotate so the disk head is positioned directly above the data, and $t_{settle}$ is the time it takes for the disk head to adjust to the desired track. Otherwise the value of d is $$\left\lfloor \frac{d_{|calc|}}{m \cdot su} \right\rfloor.$$

Maximizing the number of concurrent streams supportable by the video server also depends on the number of processors in a video server. As mentioned earlier, each processor 11-1 to 11-p is operative to transmit data at the rate $r_{disp}$. Since a duration of a round $r_i$ is $d/r_{disp}$, then each processor 11-1 to 11-p can only transmit one size d portion of data per round $r_i$. Thus, the maximum number of concurrent streams supportable by a video server, denoted herein as $q_{max}$, is limited by the p number of processors. Recall that in the present invention the value of p is computed based on the size D of the RAM buffer memory, the m number of disks and the amount of data that is being retrieved, i.e., size d portions, such that the number of concurrent streams supportable by the video server is maximized. For the present FGS scheme, the number of processors is $$\frac{\frac{d}{r_{disp}} - 2 \cdot t_{seek}}{\frac{d}{m \cdot r_{disp}} + t_{rot} + t_{settle}},$$

which is the minimum amount needed to maximized the number of concurrent streams supportable by the video server. In other words, $p = q_{max}$ Data for each concurrent stream of video $V_i$ is retrieved from the disks according to a service list assembled by the video server every round from outstanding client requests. The service list is an index of video $V_i$ streams for which data is currently being retrieved. More specifically, the service list indicates the relative position of the stripe units on the disks for each stream of video $V_i$ in which data is currently being retrieved. Note that a service list may contain entries indicating data retrieval of different stripe units belonging to the same video $V_i$ if they are for different streams. Further note that data retrieval for each and every video $V_i$ stream on the service list must be completed before the completion of the round otherwise there may be an interruption in the video $V_i$ stream. In the present FGS scheme, only one service list is required to instruct all m disk heads of the proper stripe units to retrieve, since each disk head, as discussed earlier, simultaneously retrieves the same relatively positioned stripe unit on their respective disks.

The number of entries on the service list, denoted herein as q, reflect the number of concurrent streams being retrieved. In light of such, the number of entries on the service list must never exceed the maximum number of concurrent streams that can be supported by the video server, i.e., $q \leq q_{max}$. The mere fact that the q number of videos on the service list does not exceed $q_{max}$ does not guarantee that the videos $V_i$ listed in the service list are scheduleable on p number of processors. Scheduling conflicts typically arise as a result of the individual periods $P_i$ in which new streams of videos $V_i$ are begun.

In the FGS scheme, the problem of scheduling data retrieval for videos $V_i$ periodically is the same as scheduling non pre-emptible tasks $T_1, \ldots, T_n$ having periods $P_1, \ldots, P_n$ and computation times $C_i$ on p processors. A task $T_i$, as mentioned earlier, corresponds to the job of retrieving, for a stream of video $V_i$, all data belonging to the video $V_i$ on a single disk. Applying this definition to the present fine-grained striping scheme, a task $T_i$ would consist of retrieving a block of $w_i$ number of stripe units belonging to the same video $V_i$ from a disk—for example, retrieving the stripe units $V_{i,1}$ to $V_{i,1+w \cdot m}$ from disk 30-1. The time needed to complete the task $T_i$ is referred to herein as computation time $C_i$ or run time, which is expressed in terms of rounds. For the FGS scheme, the computation time $C_i$ is equal to the number of rounds needed to retrieve the entire block of stripe units belonging to the video $V_i$ on a disk, i.e., $C_i = \lceil l_i/d \rceil$. Note that a simpler problem of determining whether periodic tasks with unit computation times are scheduleable on a single processor has been shown to be NP-hard by S. Baruah, et. al. in "International Computer Symposium, Taiwan," pages 315–320, published 1990. The term "NP-hard" is well-known in the art and refers to a complexity of a problem.

First Coarse-Grained Striping Scheme

Figure 4:
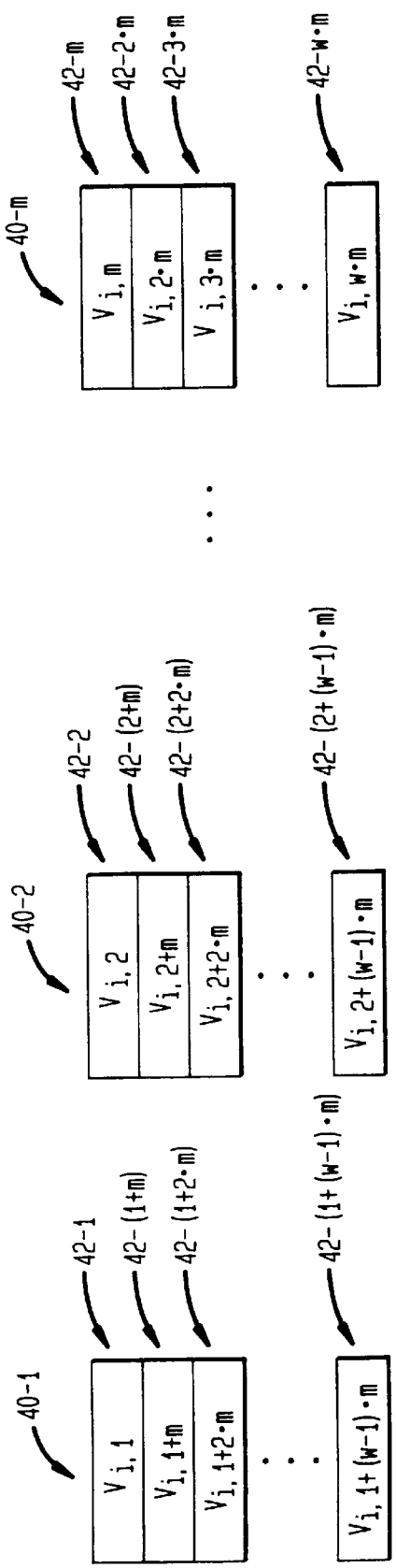
FIG. 4 depicts an exemplary first coarse-grained striping scheme for storing and retrieving videos $V_i$.

Referring to FIG. 4, there is illustrated an exemplary first coarse-grained striping scheme (also referred to herein as "first CGS scheme") for storing and retrieving videos $V_i$. The first coarse-grained striping scheme is similar in every manner to the FGS except as noted herein. As shown in FIG. 4, stripe units $\hat{V}_{hj}$ 42-1 to 42-m belonging to one or more super-videos $\hat{V}_h$, i.e., a group of concatenated videos $V_i$, are stored contiguously on disks 40-1 to 40-m in a round-robin fashion. In contrast to the FGS scheme, the size su of the stripe units in the first CGS scheme are larger and preferably equal to d. Every video $V_i$ comprising each super-video $\hat{V}_h$ preferably have a length $\hat{l}_i$ that is a multiple of d and m such that each disk has a block with $w_h$ number of stripe units belonging to the super-video $\hat{V}_h$.

Coarse-grained striping differs fundamentally from fine-grained striping in that coarse-grained striping schemes typically retrieve data for each stream of super-video $\hat{V}_h$ using one disk head at a time. The reason is that, in the present scheme, each stripe unit has a size su=d. This is in contrast to the FGS scheme, where each stripe unit has a size su=d/m. In subsequent rounds $r_h$ of the first CGS scheme, successive stripe units belonging to the same super-videos $\hat{V}_h$ are retrieved from successive disks by its respective disk head—for example, stripe unit $\hat{V}_{h,1}$ 42-1 is retrieved from disk 40-1 in the first round, stripe unit $\hat{V}_{h,2}$ 42-2 is retrieved from disk 40-2 in the second round, etc. Unlike the FGS scheme, adjacent stripe units on a disk belonging to the same super-videos $\hat{V}_h$ are retrieved at intervals of F number of rounds apart in the first CGS scheme. Specifically, in the first CGS scheme, adjacent stripe units on a disk are retrieved at intervals of m number of rounds since consecutive stripe units are stored contiguously on the m disks in a round-robin fashion—for example, stripe unit 42-1 is retrieved from disk 40-1 in the first round, and the next stripe unit on disk 40-1, i.e., stripe unit 42-1+m, is retrieved in round 1+m.

For every disk head in the present scheme, a separate service list is provided by the video server, thus there are m number of service lists. Each entry on these service lists indicates a size d portion of data being retrieved from a single disk. Contrast with the FGS scheme, where each entry represents a size su=d/m portion of data being retrieved per disk. Since each entry indicates retrieval for one size d portion of data, a processor is required for each entry. If $q_{disk\text{-}max}$ is the maximum number of entries on a service list, then $q_{disk\text{-}max} \cdot m$ is the maximum number of concurrent streams the video server is operative to support. In other words, the minimum number of processors required for the first CGS scheme such that the number of concurrent streams supportable by the video server is maximized is $p = q_{disk\text{-}max} \cdot m$. The manner of determining the value of p is disclosed herein. The number of entries in a service list is denoted herein as $q_{disk}$.

In the first CGS scheme, at the end of each round $r_h$, the service list for every disk except the first disk is set to the service list of its preceding disk—for example, the service list for disk 30-1 in round 1 becomes the service list for disk 30-2 in round 2. The reason for this is that the successive size d portions of video to be retrieved in the next round is in the same relative position on the successive disk as the preceding size d portion was on the preceding disk. The only disk that is provided with a brand new service list every round is the first disk. Accordingly, if the super-videos $\hat{V}_h$ entries contained in the service list for the first disk is scheduleable for data retrieval, then the same super-videos $\hat{V}_h$ can be scheduled for data retrieval for the other disks in the successive rounds $r_h$.

For the first coarse-grained striping scheme, the value of d is $d_{calc}$ if $\lfloor q_{disk\text{-}max} \rfloor \cdot m$ is greater than $$\left\lfloor \frac{D}{2 \cdot d_{\lceil calc \rceil}} \right\rfloor,$$

where $$d_{calc} = \frac{r_{disp}}{4} \cdot \left( 4 \cdot t_{seek} + \frac{D}{m \cdot r_{disk}} + \sqrt{\left(4 \cdot t_{seek} + \frac{D}{m \cdot r_{disk}}\right)^2 + \frac{8 \cdot D \cdot (t_{rot} + t_{settle})}{m \cdot r_{disp}}} \right)$$

is the maximum value of d, and $$q_{disk\cdot max} = \left\lfloor \frac{D}{2 \cdot d_{calc} \cdot m} \right\rfloor$$

is the maximum number of streams that can be supported by each disk per round for $d = d_{calc}$. Otherwise the value of d is $d_{\lceil calc \rceil}$, which is the minimum value of d needed to support $\lceil q_{disk\text{-}max} \rceil$ streams from a disk per round. Since there are m number of disks, the maximum number of size d portions of super-videos $\hat{V}_h$ that can be retrieved is $q_{disk\text{-}max} \cdot m$. Like the FGS scheme, the number of processors required for the first CGS scheme is computed based on the size D of the RAM buffer memory, the m number of disks and the maximum amount of data that can be retrieved. For the first CGS scheme, the value of p is $$\frac{\frac{d}{r_{disp}} - 2 \cdot t_{seek}}{\frac{d}{r_{disk}} + t_{rot} + t_{settle}}.$$

In the first CGS scheme, the problem of retrieving data for the super-videos $\hat{V}_h$ periodically is the same as that of scheduling tasks $\hat{T}_h$, i.e., $\hat{T}_1, \ldots, \hat{T}_R$, having $w_h$ non-consecutive stripe units on p processors. Each task $\hat{T}_h$ has $w_h$ number of sub-tasks, and each sub-task has a unit computation time. An interval of F number of rounds is interposed between adjacent sub-tasks belonging to the same task $\hat{T}_h$. Thus, the computation time $\hat{C}_h$ for task $\hat{T}_h$ is $w_h$ number of rounds plus $(w_h-1) \cdot m$ number of rounds, i.e., $(2w_h-1) \cdot m$ number of rounds. Note that a simpler case of scheduling tasks having single sub-tasks on a multiprocessor was shown to be NP-hard by S. Baruah, et. al., supra.

Second Coarse-Grained Striping Scheme

Figure 5:
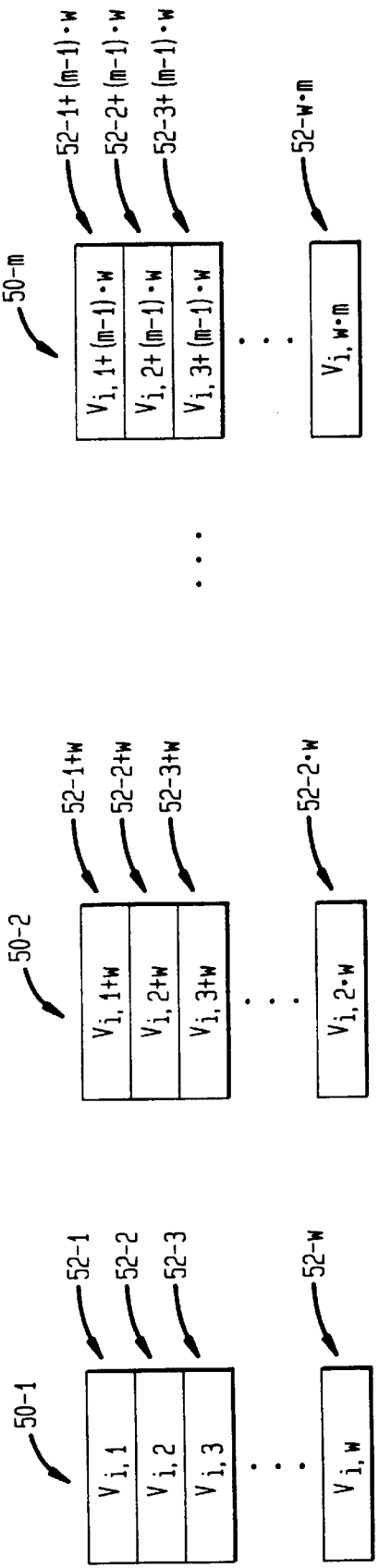
FIG. 5 depicts an exemplary second coarse-grained striping scheme for storing and retrieving videos $V_i$.

Referring to FIG. 5, there is illustrated an exemplary second coarse-grained striping scheme (also referred to herein as "second CGS scheme") for storing and retrieving videos $V_i$. The second CGS scheme is similar in every manner to the first CGS scheme except as noted herein. In contrast to the first coarse-grained striping scheme, blocks 52-1 to 52-m comprising $w_h$ number of consecutive stripe units $_{hj}$ belonging to one or more super-video $\hat{V}_h$ are stored contiguously on disks 50-1 to 50-m in a round-robin fashion, as shown in FIG. 5, where $$w_h = \max\left\{ \left\lceil \frac{\hat{l}_h}{m \cdot d} \right\rceil : 1 \leq h \leq R \right\}$$

and $\hat{l}_h$ corresponds to the length of super-video $\hat{V}_h$. In the second CGS scheme, the value of $w_h$ is identical for each and every block of super-video $\hat{V}_h$, and the length $\hat{l}_h$ of each super-video $\hat{V}_h$ is a multiple of $w_h$ such that each disk on which a block of super-video $\hat{V}_h$ is stored has a block of $w_h$ number of consecutive stripe units for each super-video $\hat{V}_h$. For every super-video $\hat{V}_h$, the first $w_h$ stripe units are stored on disk 50-1. Successive groups of $w_h$ consecutive stripe units are stored on successive disks.

Similar to the first coarse-grained striping scheme, the second coarse-grained striping scheme retrieves size d stripe units of the super-video $\hat{V}_h$ from the same disk using one disk head, starting at some round $r_h$ and at subsequent intervals of $\hat{P}_h$ rounds. Unlike the first coarse-grained striping scheme, and more like the fine-grained striping scheme, the second coarse-grained scheme continuously retrieves data from the same disk for the same video $\hat{V}_h$ stream in consecutive rounds $r_h$ until the entire block of $w_h$ number of stripe units are retrieved from that disk—for example, stripe units 52-1 to 52-$w_h$ are retrieved from disk 50-1 in the first $w_h$ number of rounds, stripe units 52-1+$w_h$ to 52-2·$w_h$ are retrieved from disk 50-2 in the next $w_h$ number of rounds, etc. Thus, there are no intervals of F number of rounds interposed between adjacent sub-tasks belonging to the same task $\hat{T}_h$.

Since there are no intervals interposed between consecutive sub-tasks of the same task $\hat{T}_h$, the problem of scheduling videos periodically in the second CGS scheme is similar to the problem of scheduling videos periodically in the FGS scheme—that is, scheduling non pre-emptible tasks $\hat{T}_1, \ldots, \hat{T}_R$ having periods $\hat{P}_1, \ldots, \hat{P}_R$ and computation times $\hat{C}_h$. For the second CGS scheme, each task $\hat{T}_1$ consist of retrieving $w_h$ number of consecutive stripe units, thus there are $w_h$ number of sub-tasks. The computation times $\hat{C}_h$ is equal to $w_h$ number of rounds.

Scheduling Schemes

In the following subsections, scheduling schemes are presented for the two basic scheduling problems that arise when retrieving data for videos periodically on multiple processors. Generally, the scheduling schemes involve determining whether the tasks are scheduleable and, if they are determined to be scheduleable, scheduling start times for the tasks.

First Scheduling Scheme

The first scheduling scheme addresses the scheduling problem presented by the FGS and second CGS schemes in a video server employing the EPPV paradigm. Specifically, the first scheduling scheme provides a valid method for scheduling non pre-emptible tasks $T_i$, i.e., $T_1, \ldots, T_n$ or $\hat{T}_1, \ldots, \hat{T}_R$, having periods $P_i$, i.e., $P_1, \ldots, P_n$ or $\hat{P}_1, \ldots, \hat{P}_R$, and computation times $C_i$ (or $\hat{C}_h$) on p number of processors. For ease of discussion, the first scheduling scheme is discussed with reference to the FGS scheme. However, such scheduling scheme should be construed to apply equally to the second CGS except as noted herein.

For the FGS scheme, the first scheduling scheme determines whether a video server having p number of processors is operative to service the group of videos contained in the one service list. Thus, all the videos on the service list must be scheduleable on p number of processors. Contrast this with the second CGS scheme where there are m number of service lists. As applied to the second CGS scheme, the first scheduling scheme determines whether a video server having p number of processors is operative to service the videos contained in the service list belonging to the first disk on p/m number of processors. Accordingly, for the second CGS scheme, the first scheduling scheme determines whether the videos on the service list belonging to the first disk are scheduleable on p/m number of processors.

The first scheduling scheme utilizes three procedures to address the scheduling problem presented by the FGS and second CGS schemes. The first procedure, referred to herein as SCHEME_1, splits a group G of tasks into two sub-groups G1 and G2 of tasks according to whether the tasks are scheduleable on less than one processor. A task is scheduleable on less than one processor if one or more other tasks may be scheduled with it on the same processor. SCHEME_1 subsequently attempts to schedule both sub-groups separately. For the sub-group of tasks not scheduleable on less than one processor, i.e., sub-group G1, SCHEME_1 schedules such tasks on p' number of processors. Note that p=p'+p", where p is the number of processors in the video server. For the sub-group of tasks scheduleable on less than one processor, i.e., sub-group G2, SCHEME_1 calls upon a second procedure, referred to herein as PARTITION, to further split the sub-group G2 into p" number of subsets G2-y such that there is one subset G2-y for each of the remaining p" number of processors. Subsequently, SCHEME_1 makes a first determination whether each subset G2-y is scheduleable on one processor. If a subset G2-y is scheduleable on one processor, SCHEME_1 schedules the tasks in the subset G2-y. Otherwise SCHEME_1 calls upon a third procedure, referred to herein as SCHEDULE_TASKS_1, to make a second determination of scheduleability for the subsets G2-y which were determined not to be scheduleable by the first determination. If SCHEDULE_TASKS_1 determines that a subset is not scheduleable and that such subset can be further partitioned, then SCHEDULE_TASKS_1 calls upon PARTITION to further divide the subset G2-y into sub-subsets $S_\nu$. After a subset G2-y has been divided into sub-subsets $S_\nu$, SCHEDULE_TASKS_1 calls itself to re-make the second determination of scheduleability for every sub-subset $S_\nu$ belonging to the partitioned subset G2-y. This technique is known as recursive partitioning. The first scheduling scheme will continue to recursively partition a sub-group, subset, sub-subset, etc. of tasks until the first scheduling scheme determines whether the sub-group, subset, sub-subset, etc. of tasks is scheduleable or not partitionable any further.

Figure 6A:
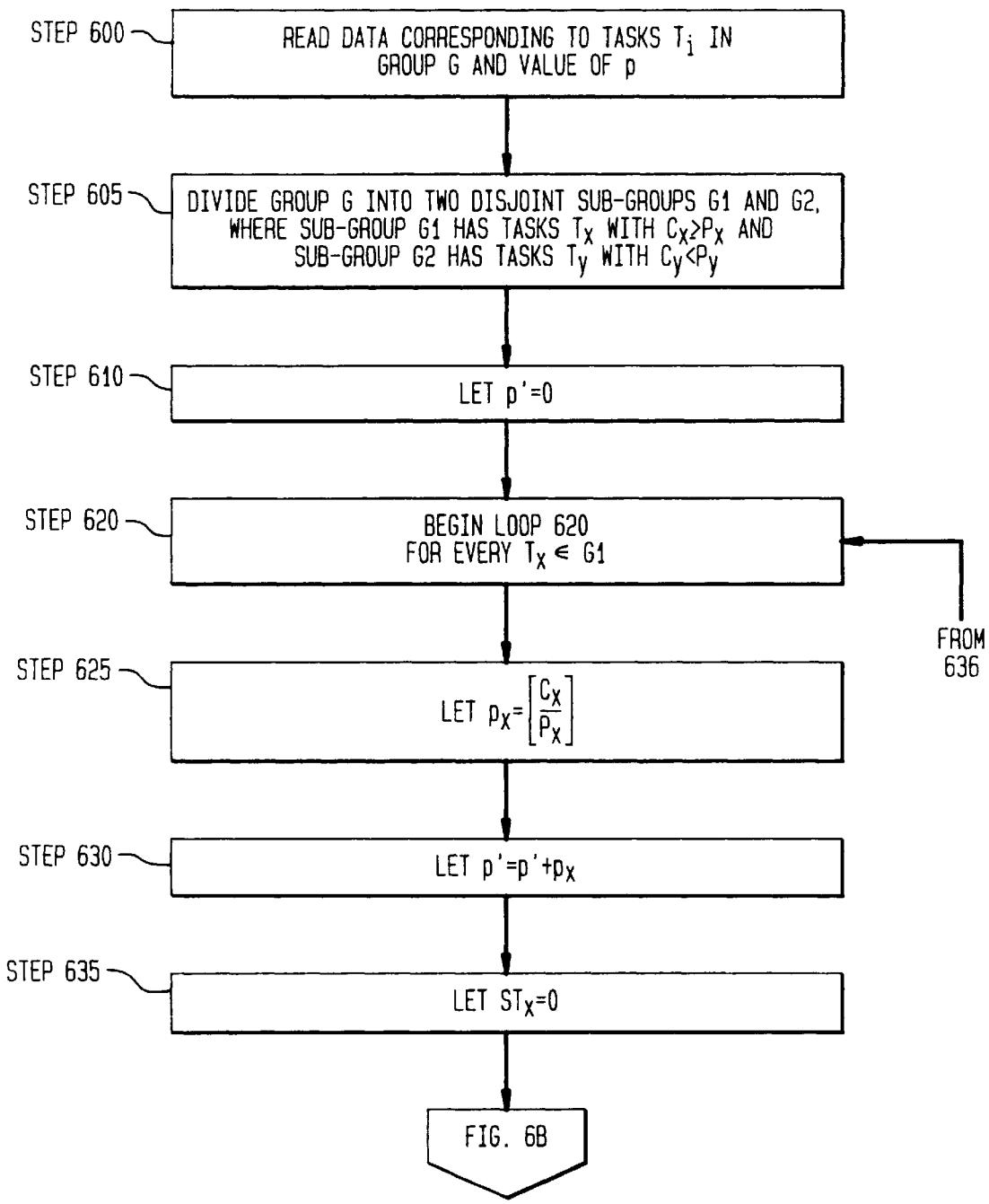

Referring to FIGS. 6a to 6e, there is illustrated an exemplary flowchart of the procedure SCHEME_1 for scheduling a group of videos contained in a service list for a video server employing a FGS scheme, i.e., scheduling non pre-emptible tasks $T_1, \ldots, T_N$ with periods $P_1, \ldots, P_N$ and computation times $C_1, \ldots, C_N$. In step 600, as shown in FIG. 6a, data corresponding to tasks $T_i$ in group G, where i=1, ..., N, and a value of p are read into the RAM buffer memory of the video server. Data corresponding to group G includes tasks $T_i$, periods $P_i$ and computation times $C_i$, i.e., $\{T_i, P_i, C_i\}$. Note that for the second CGS scheme, the value of p read into the RAM buffer memory will be p/m. In step 605, the tasks $T_i$ are categorized into sub-groups G1 and G2 according to their corresponding periods $P_i$ and computation times $C_i$. Tasks $T_i$ having computation times $C_i$ that are greater than or equal to its periods $P_i$ are not scheduleable on less than one processor because these tasks either monopolize an entire processor or will conflict with itself, i.e., two or more streams of the task will require the services of the processor at the same time. These tasks are placed in sub-group G1 and denoted herein as tasks $T_x$, i.e., $T_x \in G1$. Tasks $T_i$ having computation times $C_i$ that are less than its periods $P_i$ are scheduleable on less than one processor. These tasks are placed in sub-group G2 and denoted herein as tasks $T_y$, i.e., $T_y \in G2$.

Example 1 is provided to illustrate the first scheduling scheme. The following value of p and data corresponding to tasks $T_i$ in a service list are read into the RAM buffer memory in step 600:p=6, $\{T_1,4,8\}$, $\{T_2,4,1\}$, $\{T_3,4,1\}$, $\{T_4,3,7\}$, $\{T_5,6,1\}$ and $\{T_6,6,1\}$. Tasks $T_1$ and $T_4$ are categorized as belonging to sub-group G1, i.e., G1=$\{T_1,T_4\}$, and tasks $T_2$, $T_3$, $T_5$ and $T_6$ are categorized as belonging t sub-group G2, i.e., G2=$\{T_2, T_3, T_5, T_6\}$, in step 605.

In steps 610 to 636, SCHEME_1 schedules the tasks $T_x$ belonging to the sub-group G1 on p' number of processors, where p' is the number of processors required to service all the tasks $T_x \in G1$. In step 610, the value of p' is initially set to zero. A loop 620 is initiated, in step 620, for every task $T_x \in G1$. Specifically, the loop 620 determines $p_x$ number of processors required by the current task $T_x$ in the loop 620 using the equation $p_x = \lceil C_x/p_x \rceil$, in step 625, adds the current value of $p_x$ to p' to progressively determine the total number of processors required by sub-group G1, in step 630, and schedules the current task $T_x$ to start at a predetermined time, which preferably is time zero (expressed in terms of a round), i.e., $ST_x=0$, in step 635. The loop 620 ends when processor requirements and start times have been determined for every task $T_x \in G1$. Applying the steps in loop 620 to example 1, the following was determined: tasks $T_1$ and $T_4$ require two and three processors, respectively, and have been scheduled to start at time zero. Accordingly, five processors are reserved for sub-group G1, i.e.,p'=5.

Figure 6B:
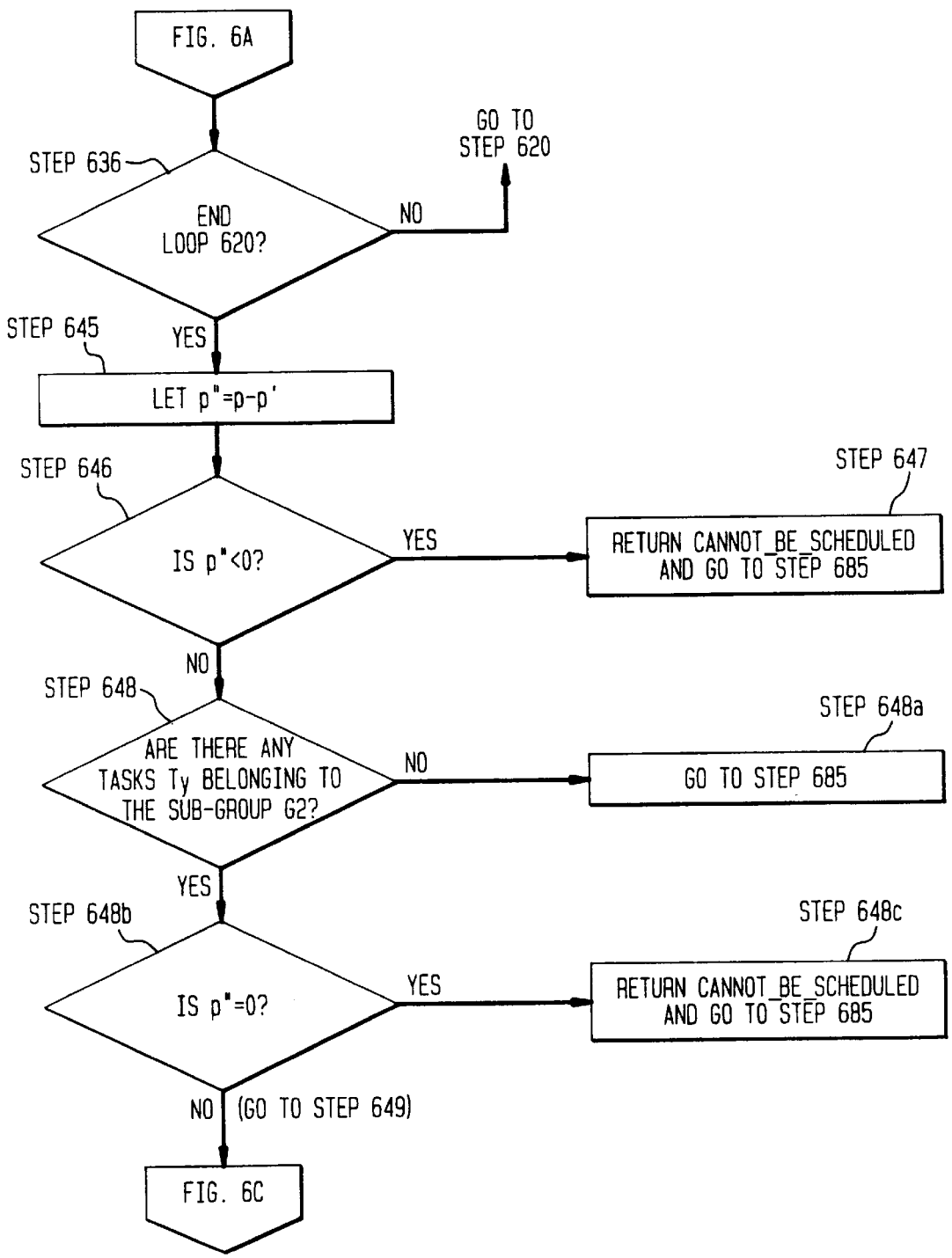

Upon completing loop 620 for every task $T_x$ or if there are no tasks $T_x$ belonging to sub-group G1, SCHEME_1 proceeds to step 645 where it determines the p" number of processors available for scheduling the tasks $T_y \in$ G2, as shown in FIG. 6b. In step 646, if p" is less than zero, then the total number of processors required to service tasks $T_x \in$ G1 is insufficient and SCHEME_1 proceeds to step 647 where it returns a cannot_be_scheduled statement before continuing to step 685 where SCHEME_1 terminates. Otherwise SCHEME_1 proceeds to step 648 where it determines whether there are any tasks $T_y$ belonging to the sub-group G2. If there are none, SCHEME_1 goes to step 648a where it is instructed to go to step 685 where it terminates. Otherwise, SCHEME_1 continues to step 648b where it checks if there are any processors available for servicing the tasks $T_y \in$ G2. If there are no processors available, SCHEME_1 goes to step 648c where a cannot_be_scheduled statement is returned before continuing to step 685 where SCHEME_1 terminates.

Figure 6C:
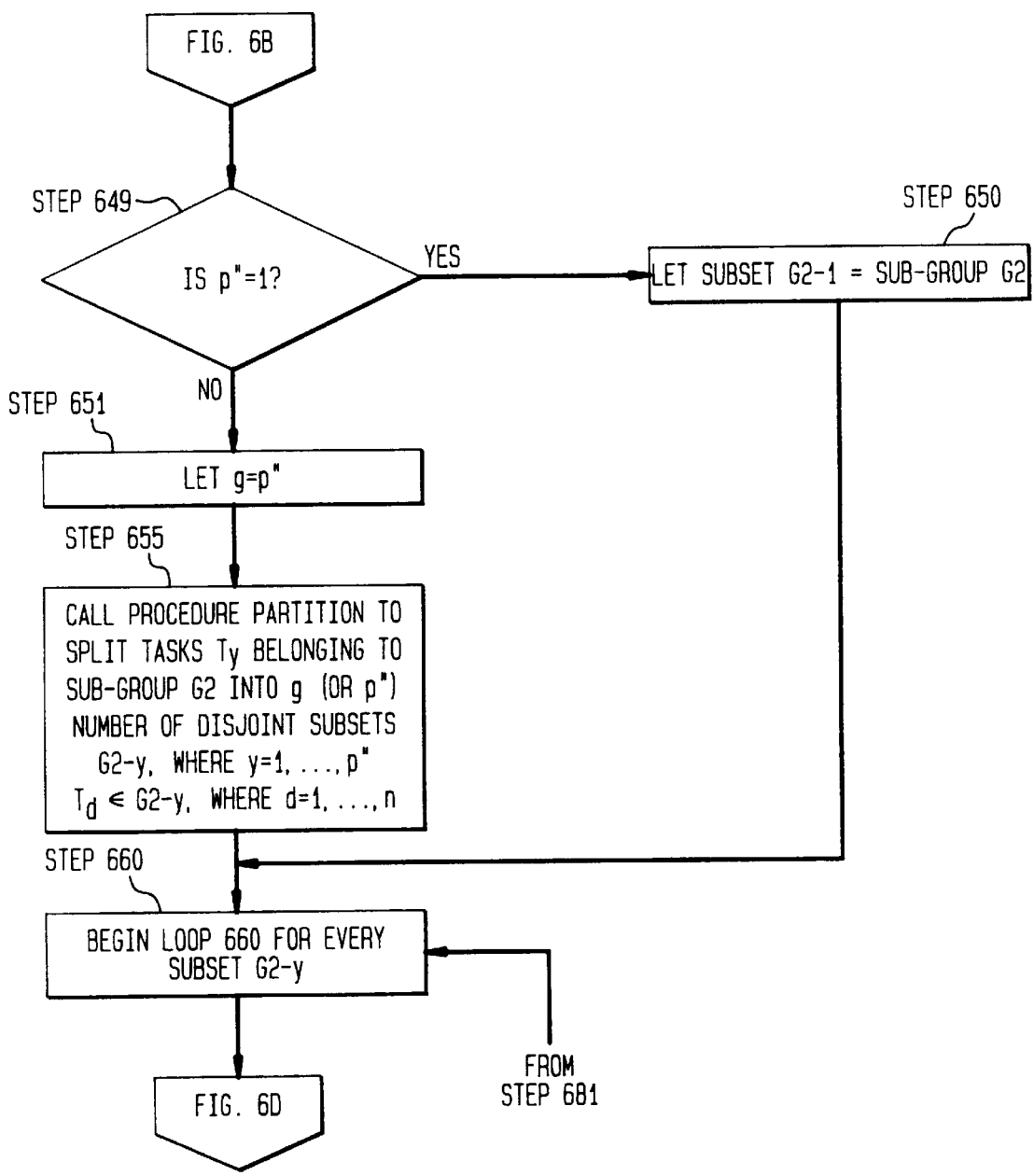

Otherwise, SCHEME_1 proceeds to divide the tasks $T_y \in$ G2 into subsets G2-y such that there is one subset G2-y for each available processor, where y=1, . . . ,p". As shown in FIG. 6c, in step 649, SCHEME_1 checks if the number of available processors for tasks $T_y$ is one. If p" is one, then all tasks $T_y \in$ G2 need to be scheduled on the one available processor. Subsequently, SCHEME_1 continues to step 650 where subset G2-1 is set equal to sub-group G2 before proceeding to step 660. If p" is not one, SCHEME_1 continues from step 649 to steps 651 and 655 where the procedure PARTITION is called to recursively partition the sub-group G2 into p" number of disjoint subsets G2-y. The procedure PARTITION will be described in greater detail herein. In example 1, the number of available processors for sub-group G2 is one, thus subset G2-1 is set equal to G2, i.e., $\{T_2, T_3, T_5, T_6\}$, in step 650. Tasks in the subsets G2-y are donated herein as $T_d$, where d=1, . . . ,n, i.e., $T_d \in$ G2-y.

A loop 660 is initiated for every subset G2-y in step 660 to make a first determination of scheduleability, i.e., is each subset G2-y scheduleable on one processor. In step 670, the following theorem, denoted herein as Theorem 1, is applied in SCHEME_1: if $C_1 + \ldots + C_n \leq \gcd(P_1 + \ldots + P_n)$, then tasks $T_1, \ldots, T_n$ are scheduleable on a single processor, where $\gcd(P_1 + \ldots + P_n)$ is the greatest common divisor of the periods $P_d$, and the start times $ST_1, \ldots, ST_n$ for each task $T_1, \ldots, T_n$ is determined by adding the computation times $C_d$ of the earlier scheduled tasks $T_d$, i.e., $$\sum_{d'=0}^{d-1} C_{d'},$$

where $0 \leq d' < d$. Note that when d=1, the first scheduled task $T_1$ starts at time zero. If Theorem 1 is satisfied for a subset G2-y, then every task $T_d$ in the subset G2-y can be scheduled at $$Q \cdot \gcd(P_l, \ldots, P_n) + \sum_{d'=0}^{d-1} C_{d'},$$

where Q is an arbitrary positive integer, and each $T_d$ will have reserved for its exclusive use one or more rounds within each time interval of length equal to the greatest common divisor (also referred to herein as "gcd interval"). Note that failure to satisfy Theorem 1 does not conclusively determine that the subset G2-y is not scheduleable on one processor.

Figure 7:
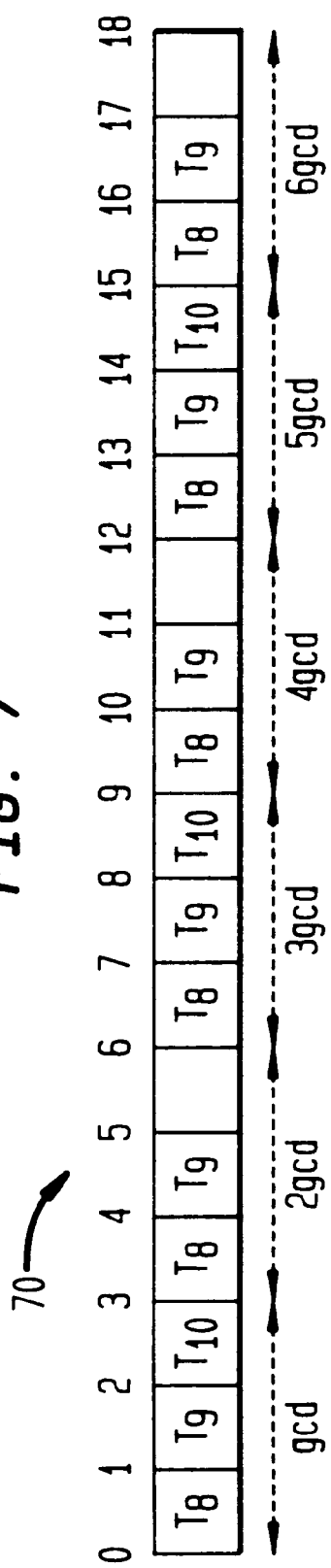
FIG. 7 depict an exemplary diagram proving the validity of Theorem 1.

Referring to FIG. 7, there is illustrated an exemplary diagram proving the validity of Theorem 1. Consider tasks $T_8$, $T_9$ and $T_{10}$ having periods $P_8=3$, $P_9=3$ and $P_{10}=6$ and unit computation times, i.e., $C_8=C_9=C_{10}=1$. The gcd(3,3,6) is three and the sum of the computation times is three, and thus Theorem 1 is satisfied. Using the equation $$ST_d = \sum_{d'=0}^{d-1} C_{d'},$$

new streams of tasks $T_8$, $T_9$ and $T_{10}$ are scheduled to begin in rounds 0, 1 and 2, respectively. As shown in FIG. 7, a schedule 70 is created for servicing tasks $T_8$, $T_9$ and $T_{10}$ on a single processor. Specifically, the first, second and third rounds in each gcd interval are reserved for the exclusive use by tasks $T_8$, $T_9$ and $T_{10}$, respectively—rounds 0, 3, 6, 9, 12 and 15 are reserved to begin new streams corresponding to task $T_8$, rounds 1, 4, 7, 10, 13 and 16 are reserved to begin new streams corresponding to task $T_9$ and rounds 2, 8 and 14 are reserved to begin new streams corresponding to task $T_{10}$. Note that rounds 5, 11 and 17 are also reserved for the exclusive use by task $T_{10}$ although no new streams are to begin in those rounds. Accordingly, by reserving the rounds within each gcd interval, scheduling conflicts are averted. In example 1, the sum of the computation times is four and the greatest common divisor is two, thus Theorem 1 is not satisfied and SCHEME_1 proceeds to step 676.

Figure 6D:
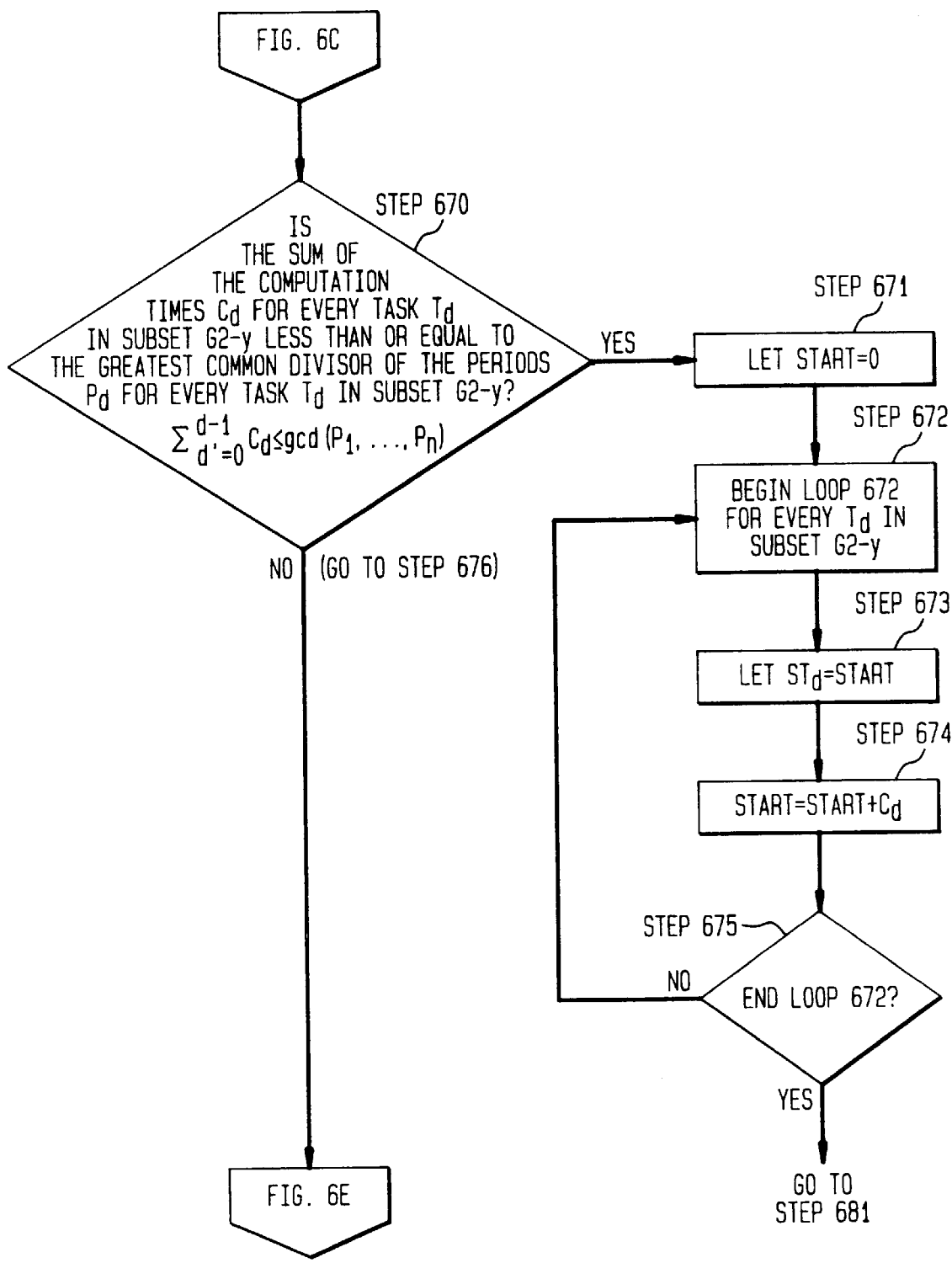

As shown in FIG. 6d, if Theorem 1 is satisfied for the current subset G2-y in the loop 660, SCHEME_1 continues to steps 671 to 675 where a loop 672 determines the start times for each task $T_d \in$ G2-y using the equation $$ST_d = \sum_{d'=0}^{d-1} C_{d'},$$

before proceeding to step 681. Specifically, the loop 672 adds the computation times of the earlier tasks to determine a start time for the current task in the loop 672. Upon completion of the loop 672, SCHEME_1 goes to step 681 where it determines whether the loop 660 is complete. If Theorem 1 is not satisfied for a subset G2-y, SCHEME_1 goes to steps 676 and 680 and makes a second determination of scheduleability for the subset G2-y that did not satisfy Theorem 1. In step 676, as shown in FIG. 6e, SCHEME_1 looks for a minimum value of $C_{G2-y}$ that satisfies the following two conditions: (1) $C_{G2-y}$ is greater than or equal to any $C_d \in$ G2-y, i.e., $C_{G2-y} \geq C_d$; and (2) $C_{G2-y}$ divides evenly into every $P_d \in$ G2-y, i.e., $(C_{G2-y} \mod P_d)=0$. If these conditions are not satisfied, SCHEME_1 returns a cannot_be_scheduled statement, in step 677, before terminating. Otherwise SCHEME_1 proceeds to step 680 where the procedure SCHEDULE_TASKS_1 is called to make a second determination of scheduleability for the subset G2-y that failed to satisfy Theorem 1. Applying the instructions in steps 676 and 680 to example 1, the minimum value $C_{G2-1}$ is set equal to one and SCHEDULE_TASKS_1 is called to make a second determination of scheduleability for the subset G2-1.

Figure 8A:
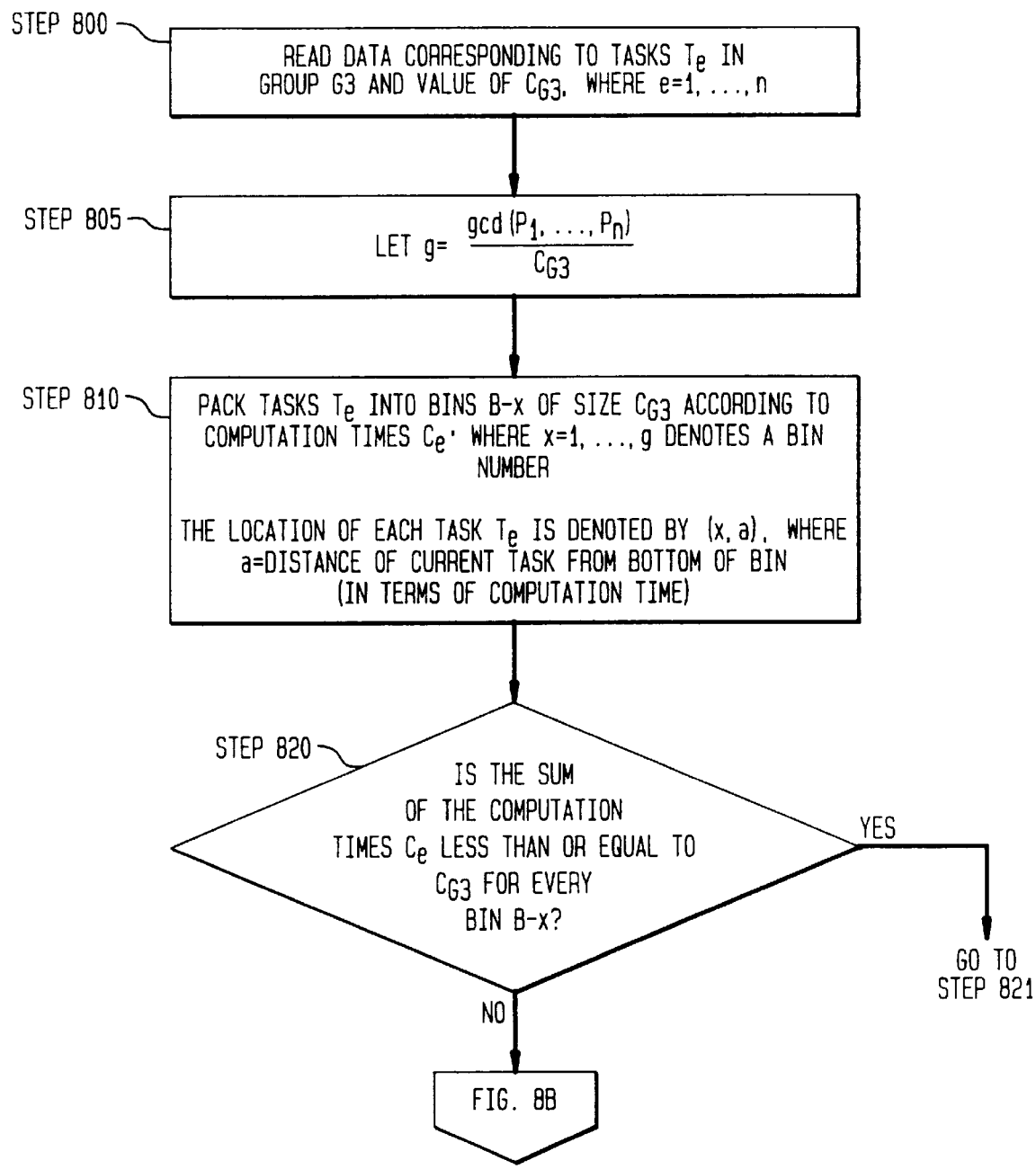
FIGS. 8a to 8d depict an exemplary flowchart of a procedure for scheduling a group of tasks in FIGS. 6a to 6e with computation times greater than its periods.

Referring to FIGS. 8a to 8d, there is illustrated an exemplary flowchart of the procedure SCHEDULE_TASKS_1. As shown in FIG. 8a, SCHEDULE_TASKS_1 reads data as tasks $T_e$ in group G3 and $C_{G3}$, in step 800. Thus, tasks $T_d \in$ G2-y and $C_{G2-y}$ from SCHEME_1 are read by SCHEDULE_TASKS_1 as $T_e \in$ G3 and $C_{G3}$, respectively. Note that these calls to SCHEDULE_TASKS_1 from SCHEME_1 for the subsets G2-y are referred to herein as first level invocations of SCHEDULE_TASKS_

1. In steps 805 to 824, SCHEDULE_TASKS_1 makes a second determination of scheduleability by packing the tasks $T_e$ into g number of bins B-x of size $C_{G3}$, where x=1, . . . ,g, according to its computation times $C_e$. In step 805, the value of g is determined using the equation $$g = \frac{gcd(P_1, \ldots, P_n)}{C_{G3}}$$

and, in step 810, the tasks $T_e$ are packed into the bins B-x. Preferably, in step 810, the tasks $T_e$ are sorted in descending order according to computation times $C_e$ and subsequently assigned, one task at a time in sorted order, to a bin B-x for which the sum of the computation times $C_e$ of previously assigned tasks $T_e$ in that bin is minimum. An (x,a) pair indicates the location of a specific task $T_e$ after it has been packed, where x is the bin number and a is the distance, expressed in terms of computation time, the task $T_e$ is from the bottom of bin x. Applying steps 805 and 810 to example 1, the value of g is set to two and bin B-1 will contain, from bottom to top, tasks $T_2$ and $T_5$ and bin B-2 will contain, from bottom to top, tasks $T_3$ and $T_6$.

Figure 8B:
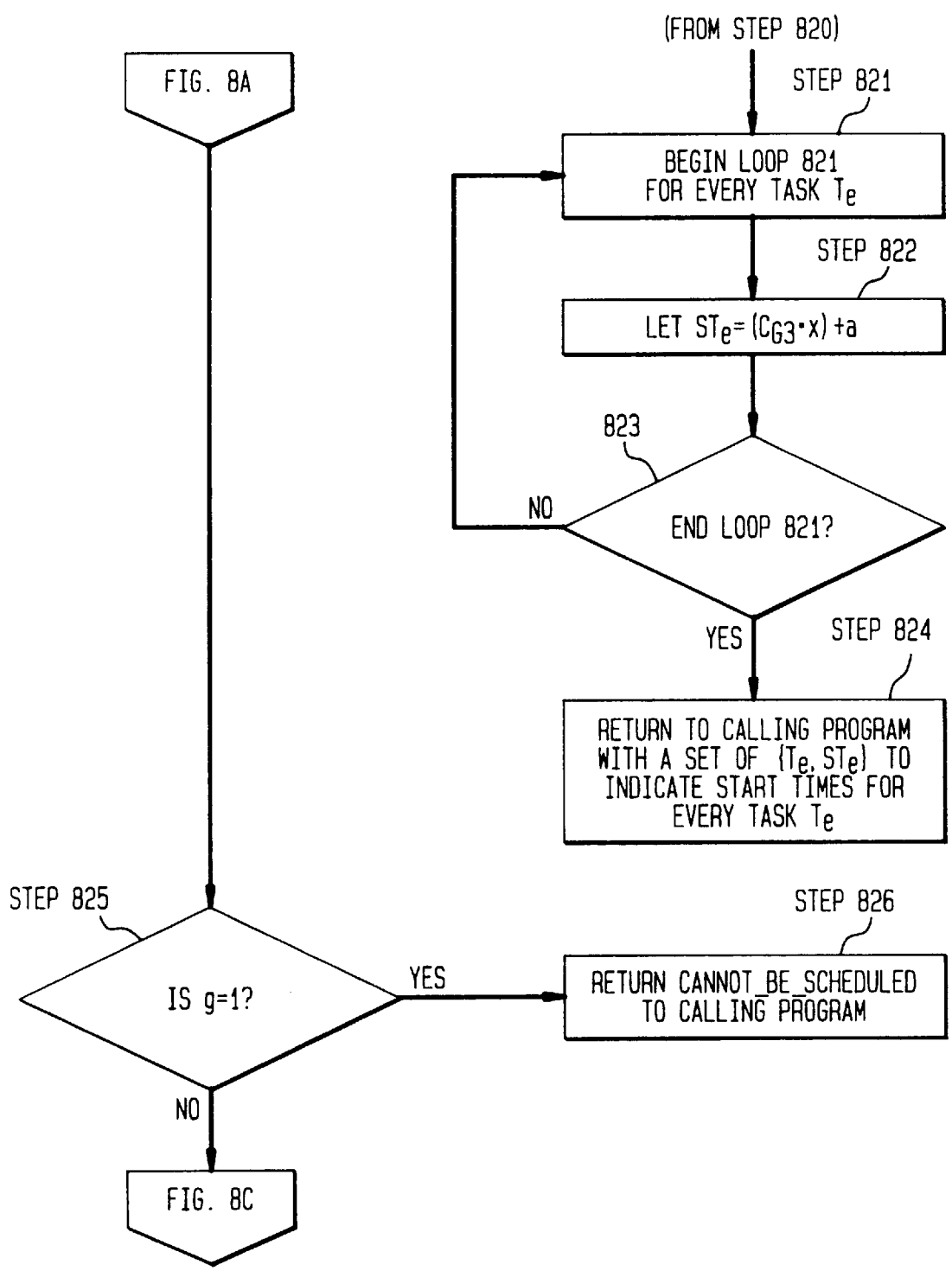

In step 820, each bin is checked to determine whether the sum of the computation times $C_e$ for the tasks $T_e$ assigned to the bin B-x is less than or equal to the value of $C_{G3}$. If the condition in step 820 is satisfied for each bin B-x, then the tasks $T_e$ belonging to group G3 will not conflict with each other and are scheduleable. In such a case, SCHEDULE_TASKS_1 proceeds to steps 821 to 824, as shown in FIG. 8b, where the start times $ST_e$ are determined for each task $T_e \in$ G3 in a loop 821. Specifically, in step 822, the start time $ST_e$ for a current task $T_e$ in the loop 821 is calculated according to its (x,a) pair using the equation $ST_i = (C_{G3} \cdot x) + a$. Upon determining the start times $ST_e$ for each task $T_e$, the start times are returned to the calling program, in step 824. Note that the calling program is either SCHEME_1 or a previous level invocation of SCHEDULE_TASKS_1, as will be explained herein.

Figure 8C:
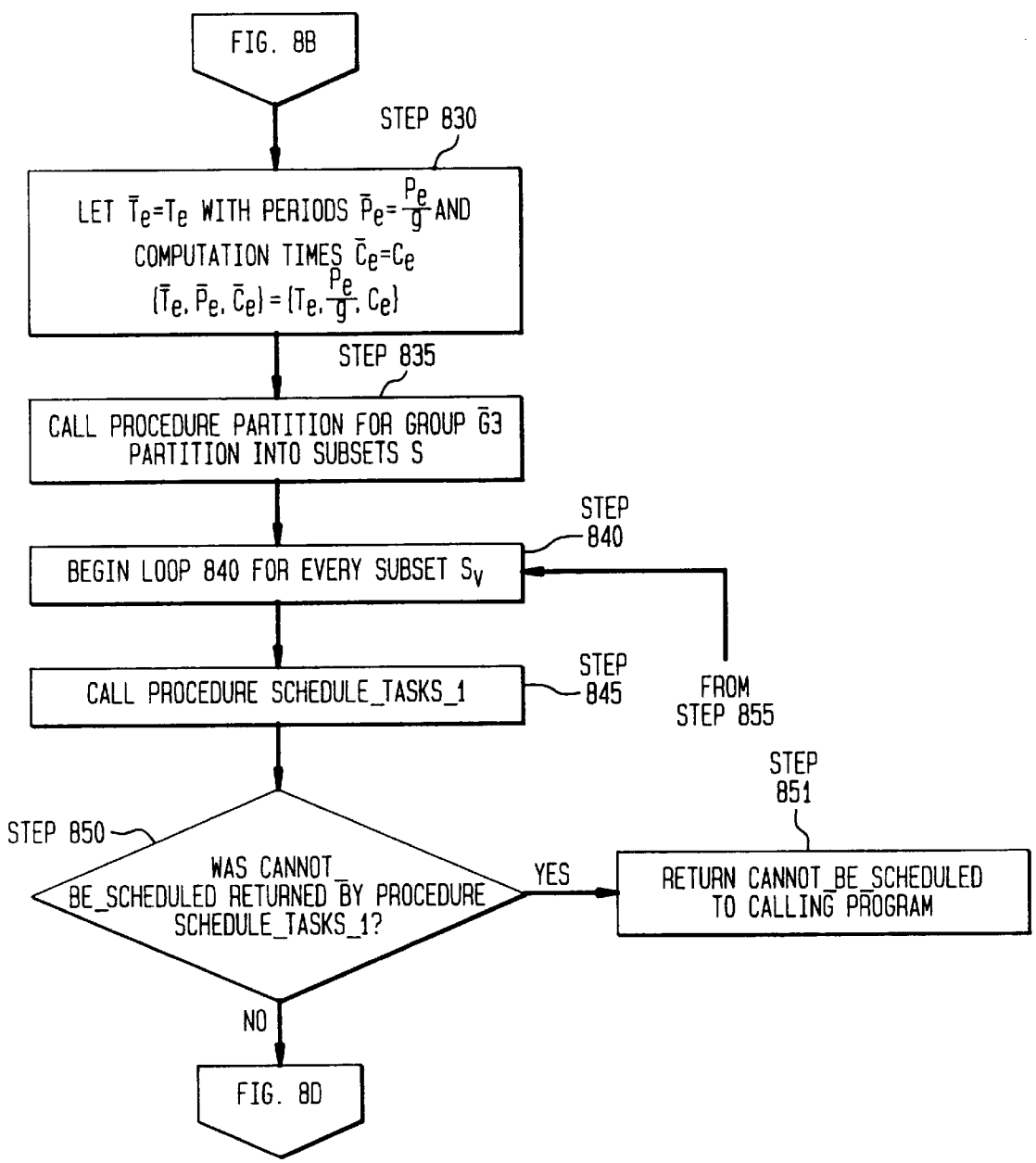

A later level invocation of SCHEDULE_TASKS_1 may occur for the tasks $T_e \in$ G3 if the condition in step 820 is not satisfied. In such a case, SCHEDULE_TASKS_1 tries to recursively partition the group G3 into subsets $S_v$, where v=1, . . . ,g, and then tries to schedule the tasks in each of the subsets $S_v$ by calling SCHEDULE_TASKS_1 for each subset $S_v$. For a group of tasks $T_e \in$ G3 that do not satisfy the condition in step 820, SCHEDULE_TASKS_2 proceeds to step 825 where it determines whether the group G3 can be recursively partitioned any further. If the value of g is one, then the group G3 cannot be recursively partitioned any further and, in step 826, a cannot_be_scheduled statement is returned to the calling program. If the value of g is not one, then the data in group G3 is transposed into group $\overline{G3}$, in step 830, as shown in FIG. 8c, i.e., from $\{T_e, P_e, C_e\}$ to $\{\overline{T}_e, \overline{P}_e, \overline{C}_e\}$ where $\{\overline{T}_e, \overline{P}_e, \overline{C}_e\} = \{T_e, P_e/g, C_e\}$, so it may be recursively partition into subset $S_v$ by a call to the procedure PARTITION in step 835. In example 1, the sums of the computation times $C_2$ and $C_5$ for bin B-1 and computation times $C_3$ and $C_6$ for bin B-2 are both two, which is greater than $C_{G3}$, which is one, thus the condition in step 820 is not satisfied. Accordingly, the data corresponding to tasks $T_e$ in example 1 are transposed in step 830 before being partitioned. The transposed data is as follows: $\{\overline{T}_2, 4/2, 1\}$, $\{\overline{T}_3, 4/2, 1\}$, $\{\overline{T}_5, 6/2, 1\}$ and $\{\overline{T}_6, 6/2, 1\}$.

Upon returning from the call to PARTITION, SCHEDULE_TASKS_1 attempts to schedule each subset $S_v$ using a later level invocation of itself in steps 840 and 845. The first group of calls by SCHEDULE_TASKS_1 to itself for each subset $S_v$ is referred to herein as a second level invocation of SCHEDULE_TASKS_1. Note that in the second level invocation of SCHEDULE_TASKS_1, data corresponding to tasks $\overline{T}_e \in S_v$ are read as tasks $T_e \in$ G3 by the later level invocation of SCHEDULE_TASKS_1. A second level invocation of SCHEDULE_TASKS_1 may lead to a third level invocation of SCHEDULE_TASKS_1, which may lead to a fourth level invocation, etc., until either a cannot_be_scheduled statement or start times are returned to the previous level invocation of SCHEDULE_TASKS_1. Recall that a level one invocation occurs when SCHEDULE_TASKS_1 is called by SCHEME_1 in step 680. In step 850, SCHEDULE_TASKS_1 determines if a cannot_be_scheduled statement was returned by any level invocation of SCHEDULE_TASKS_1. If such a statement was returned, the tasks $T_y \in$ G2 are deemed not scheduleable on p" number of processors and SCHEDULE_TASKS_1 returns a cannot_be_scheduled statement to its calling program in step 851.

Figure 8D:
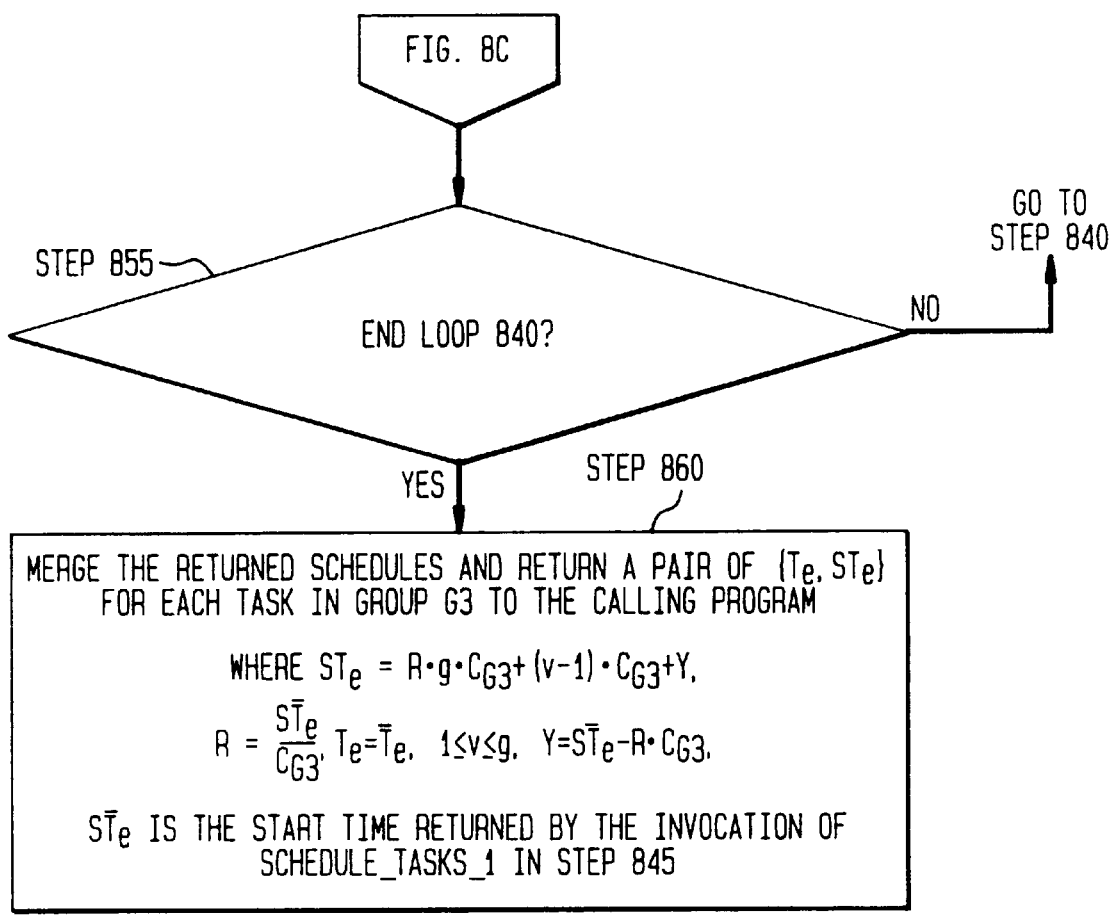

If start times are returned to a previous level invocation of SCHEDULE_TASKS_1 in step 845 by a later level invocation of SCHEDULE_TASKS_1, then the start times are merged before being returned to the calling program in step 860, as shown in FIG. 8d, using the equation $ST_e = R \cdot g \cdot C_{G3} + (V-1) \cdot C_{G3} + Y$, where $$R = \left\lfloor \frac{\overline{ST}_e}{C_{G3}} \right\rfloor, T_e = \overline{T}_e, 1 \leq v \leq g, Y = \overline{ST}_e - R \cdot C_{G3} \text{ and } \overline{ST}_e$$

are the start times returned by the later level invocation of SCHEDULE_TASKS_1 in step 845. Note that the value $C_{G3}$ remains the same through every later invocation of SCHEDULE_TASKS_1.

Figure 9A:
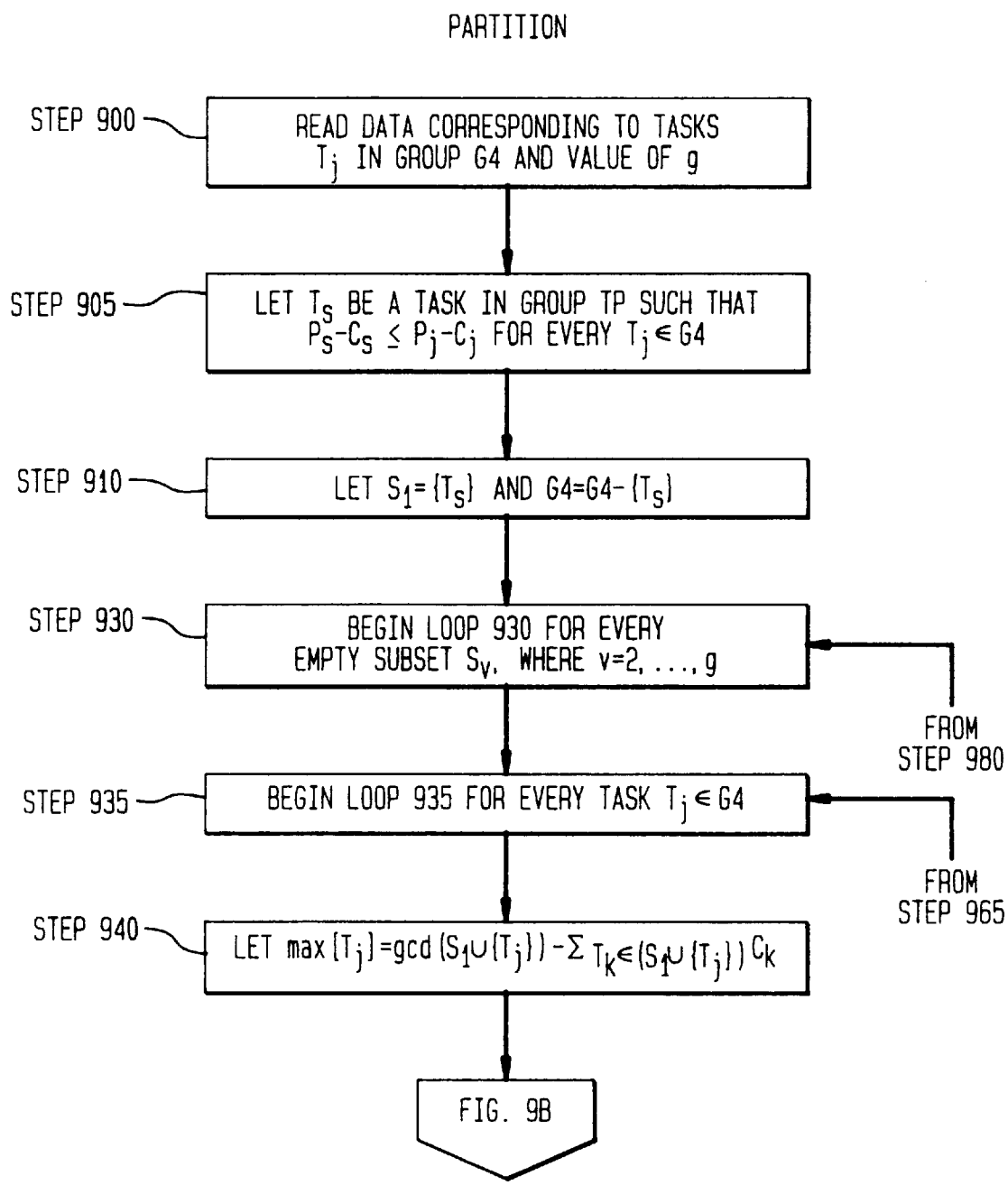

Referring to FIGS. 9a to 9d, there is illustrated an exemplary flowchart of the procedure PARTITION. As shown in FIG. 9a, PARTITION reads data as tasks $T_j$ in group G4 and g, in step 900. PARTITION sequentially assigns tasks $T_j \in$ G4 to subsets $S_v$ according to slack values, which are the differences between the $gcd(P_1, \ldots, P_n)$'s and sums of the computation times $C_j$. To be scheduleable, each subset $S_v$ must have a non-negative slack value, i.e., greatest common divisor of periods $P_j$ in a subset is greater than or equal to the sum of the computation times in the same subset. Thus the goal of PARTITION is to assign tasks $T_j$ to the subsets $S_v$ such that they all have non-negative slack values. PARTITION attempts to achieve this goal by maximizing the overall slack values for the subsets $S_v$. Note that $gcd(P_1, \ldots, P_n)$ is also referred to herein as $gcd(T_1, \ldots, T_n)$.

In steps 905 to 980, PARTITION sequentially assigns to each empty subset $S_v$ a task $T_j$ from group G4. As will be understood, a subset $S_v$ is empty if it has no tasks assigned. The task $T_j$ assigned to each empty subset $S_v$ is a specific task $T_j \in$ G4 that would yield a minimum slack value if that task $T_j$ was assigned to any non-empty subsets $S_1, \ldots, S_{v-1}$. In other words, PARTITION searches for a combination of task $T_j$ and non-empty subset $S_v$ which yields the lowest slack value. In step 905, PARTITION assigns a first task $T_j \in$ G4 to subset $S_1$. Specifically, PARTITION examines the slack value for subset $S_1$ if task $T_j \in$ G4 is assigned to subset $S_1$. A task $T_s$ that would yield the least amount of slack if assigned to subset $S_1$ is subsequently assigned to subset $S_1$ and removed from group G4 in step 910. In other words, task $T_s$ is a task in group G4 where $gcd(P_s) - C_s \leq gcd(P_j) - C_j$ for every task $T_j \in$ G4. In example 1, task $\overline{T}_e$ is assigned to subset $S_1$ since it yields a slack of one—tasks $\overline{T}_3, \overline{T}_5$ and $\overline{T}_6$ would yield a slack of one, two and two, respectively.

In steps 930, a loop 930 is initiated to assign a task to each of the remaining empty subsets $S_v$ one at a time. Note that at the beginning of the loop 930, subsets $S_2, \ldots, S_g$ are empty. The loop 930 assigns a task $T_j \in G4$ to each of the empty subsets $S_v$ according to hypothetical slack values. Specifically, in steps 930 to 965, PARTITION hypothetically assigns task $T_j$ to every non-empty subset $S_v$, i.e., $S_1, \ldots, S_{v-1}$ and stores the slack values for each non-empty subset $S_v$ in an array named max[$T_j$]. In step 935, a loop 935 is initiated to create an array max[$T_j$] for each task $T_j$. In step 940, PARTITION determines the slack value for subset $S_1$ if the current task $T_j$ of the loop 935 was assigned to it. Such slack value is stored in the array max[$T_j$]. In step 950, as shown in FIG. 9b, a loop 950 is initiated to determine the hypothetical slack values for every other non-empty subset $S_2, \ldots, S_{v-1}$ if the current task $T_j$ is assigned to them. Such slack values are also stored in their respective max[$T_j$] arrays.

Upon completing the loop 935 for a current task $T_j$, PARTITION proceeds from step 965 to step 970, as shown in FIG. 9c, where PARTITION compares the max[$T_j$] arrays and finds a task $T_u$ in the group G4 such that max[$T_u$]≦max [$T_j$] for every $T_j \in G4$. In other words, PARTITION searches through the max[$T_j$] arrays for the minimum possible slack value. Subsequently, task $T_u$ is assigned to the current empty subset $S_v$ of the loop 930 and removed from group G4, in step 975. The loop 930 is repeated until no empty subsets $S_v$ remain. In example 1, task $\overline{T}_5$ is assigned to subset $S_2$ because its slack value, if assigned to the subset $S_1$, would be negative one—tasks $\overline{T}_3$ and $\overline{T}_6$ would yield slack values of zero and negative one if assigned to the non-empty subset $S_1$.

Figure 9D:
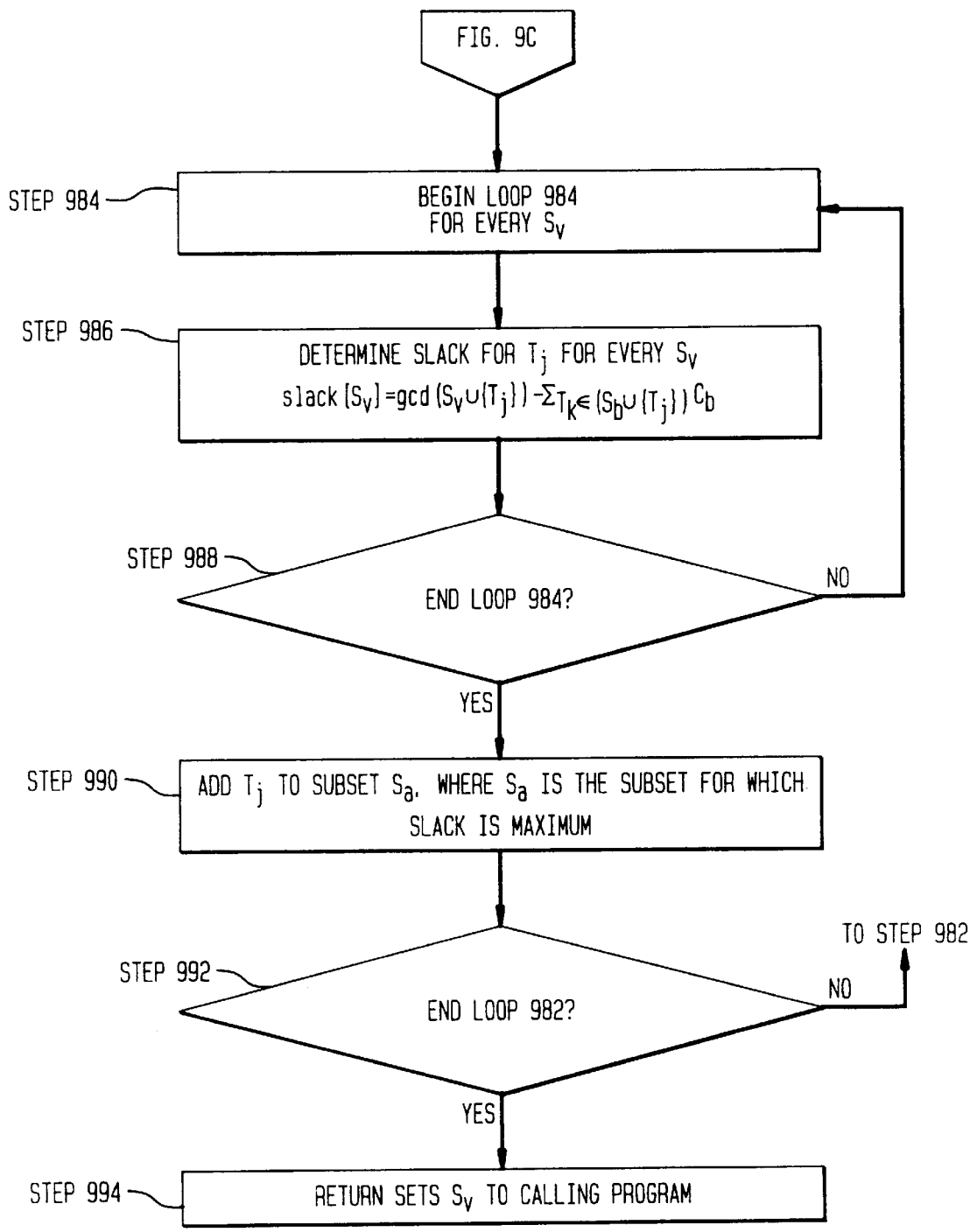

Upon completing the loop 930, the remaining unassigned tasks $T_j \in G4$ are assigned to subsets $S_v$, in steps 982 to 992, such that the overall slack values for the subsets $S_v$ are maximized. A loop 982 is initiated, in step 982, for every $T_j \in G4$. The loop 982, in steps 984 to 988, as shown in FIG. 9d, hypothetically assigns the current task $T_j$ of the loop 982 to each non-empty subset $S_v$, while determining the slack value for each subset $S_v$. In step 990, task $T_j$ is assigned to the subset $S_v$ for which the maximum slack value is yielded. Steps 982 to 992 are repeated until every task $T_j$ have been assigned. Upon assigning every task $T_j$, in step 994, data indicating the tasks $T_j$ which comprises each subset $S_v$ is returned to the calling program.

Applying steps 982 to 992 to example 1, task $\overline{T}_3$ is assigned to subset $S_1$ since it would yield slack values of zero and one if task $\overline{T}_3$ was assigned to subsets $S_1$ and $S_2$, respectively, and task $\overline{T}_6$ is assigned to $S_2$ since it would yield slack values of negative two and positive one if task $\overline{T}_6$ was assigned to subsets $S_1$ and $S_2$, respectively. Thus, $S_1=\{\overline{T}_2, \overline{T}_3\}$ and $S_2=\{\overline{T}_5, \overline{T}_6\}$. Control is returned to the calling program SCHEDULE_TASKS_1 at step 840. Accordingly, a second level invocation of SCHEDULE_TASKS_1 is performed for subsets $S_1=\{\overline{T}_2, \overline{T}_3\}$ and $S_2=\{\overline{T}_5, \overline{T}_6\}$. In these second level invocations, the instructions in steps 805 to 824 of SCHEDULE_TASKS_2 determine the subsets $S_1$ and $S_2$ to be scheduleable, and start times $\overline{ST}_2=0$, $\overline{ST}_3=1$, $\overline{ST}_5=0$ and $\overline{ST}_6=1$ are returned to the first level invocation of SCHEDULE_TASKS_1 at step 850. The start times $\overline{ST}_e$ are subsequently merged in step 860 and returned to SCHEME_1 at step 680. Merging the start times $\overline{ST}_e$ yields the following start times $ST_e$: $ST_2=0$, $ST_3=2$, $ST_5=1$ and $ST_6=3$.

Second Scheduling Scheme

The second scheduling scheme addresses the scheduling problem presented by the first CGS scheme in a video server employing the EPPV paradigm. Specifically, the second scheduling scheme provides a valid method for scheduling non pre-emptible tasks $T_i$ having periods $P_i$ on p number of processors, wherein the tasks $T_i$ comprises $w_i$ number of sub-tasks, each of unit computation times, at intervals of F rounds apart.

The second scheduling scheme utilizes four procedures to address the scheduling problem presented by the first CGS scheme. The first procedure, referred to herein as SCHEME_2, splits a group G of tasks contained in a service list into two sub-groups G1 and G2 of tasks according to whether the tasks are scheduleable on a single processor. SCHEME_2 subsequently attempts to schedule both sub-groups G1 and G2 separately. For the sub-group of tasks not scheduleable on a single processor, i.e., sub-group G1, SCHEME_2 schedules such tasks on p' number of processors. For the sub-group of tasks scheduleable on a single processor, i.e., sub-group G2, SCHEME_2 calls upon PARTITION to further split the sub-group G2 into subsets G2-y such that there is one subset G2-y for each of the remaining p" number of processors. For each subset G2-y, SCHEME_2 calls a third procedure, referred to herein as SCHEDULE_TASKS_2, to determine scheduleability. SCHEDULE_TASKS_2 uses a fourth procedure, referred to herein as IS_SCHEDULEABLE, to assist it in determining scheduleability of a subset G2-y. If IS_SCHEDULEABLE determines that a subset G2-y is not scheduleable and SCHEDULE_TASKS_2 determines that the same subset G2-y can be further partitioned, then SCHEDULE_TASKS_2 calls upon PARTITION to further divide the subsets G2-y into sub-subsets $S_v$. After the subset G2-y has been partitioned, SCHEDULE_TASKS_2 calls itself to re-determine scheduleability. The second scheduling scheme will recursively partition a sub-group, subset, etc. of tasks until the second scheduling scheme determines whether the sub-group, subset, etc. of tasks is scheduleable or not partitionable any further.

Figure 10A:
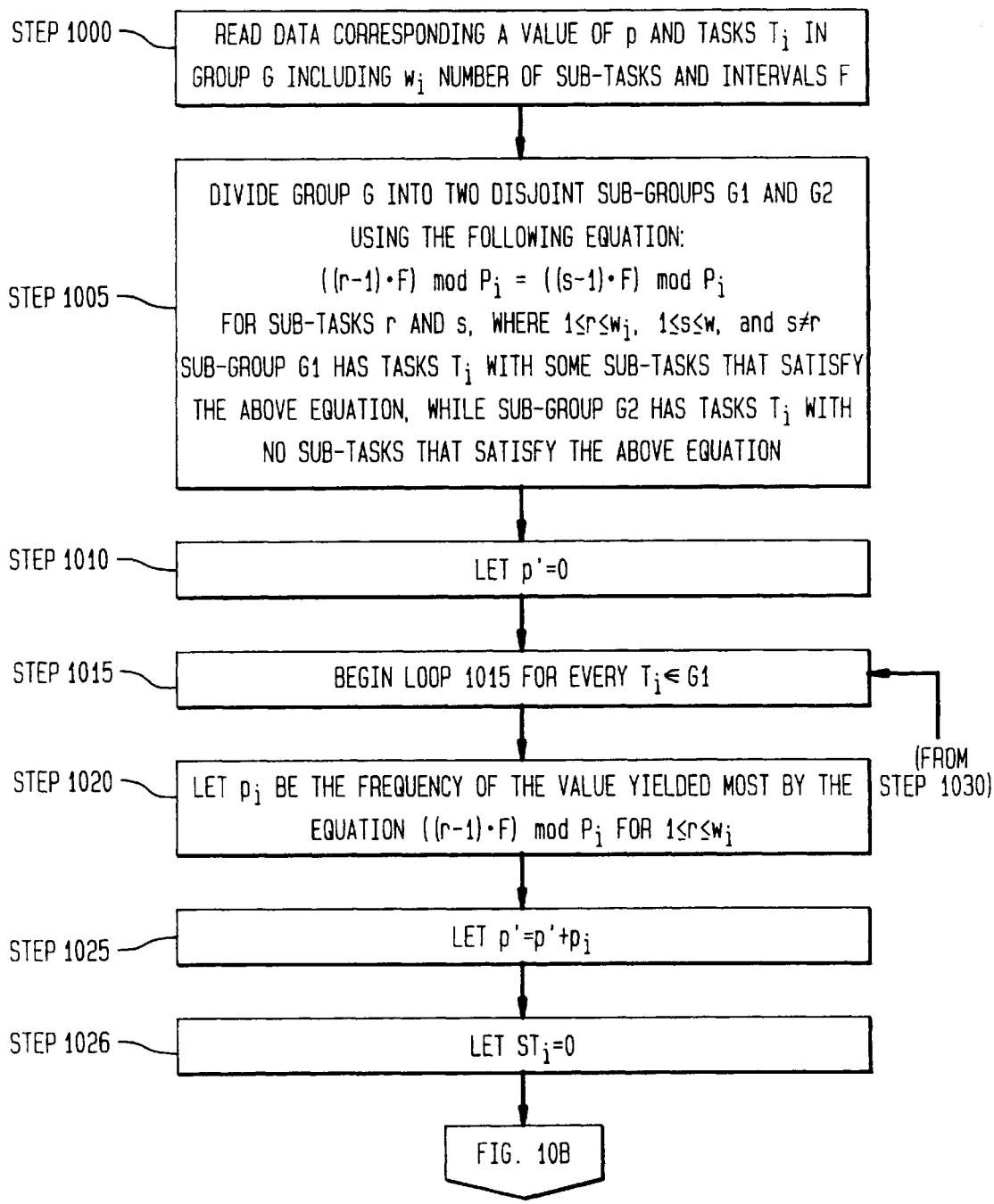
Figure 10B:
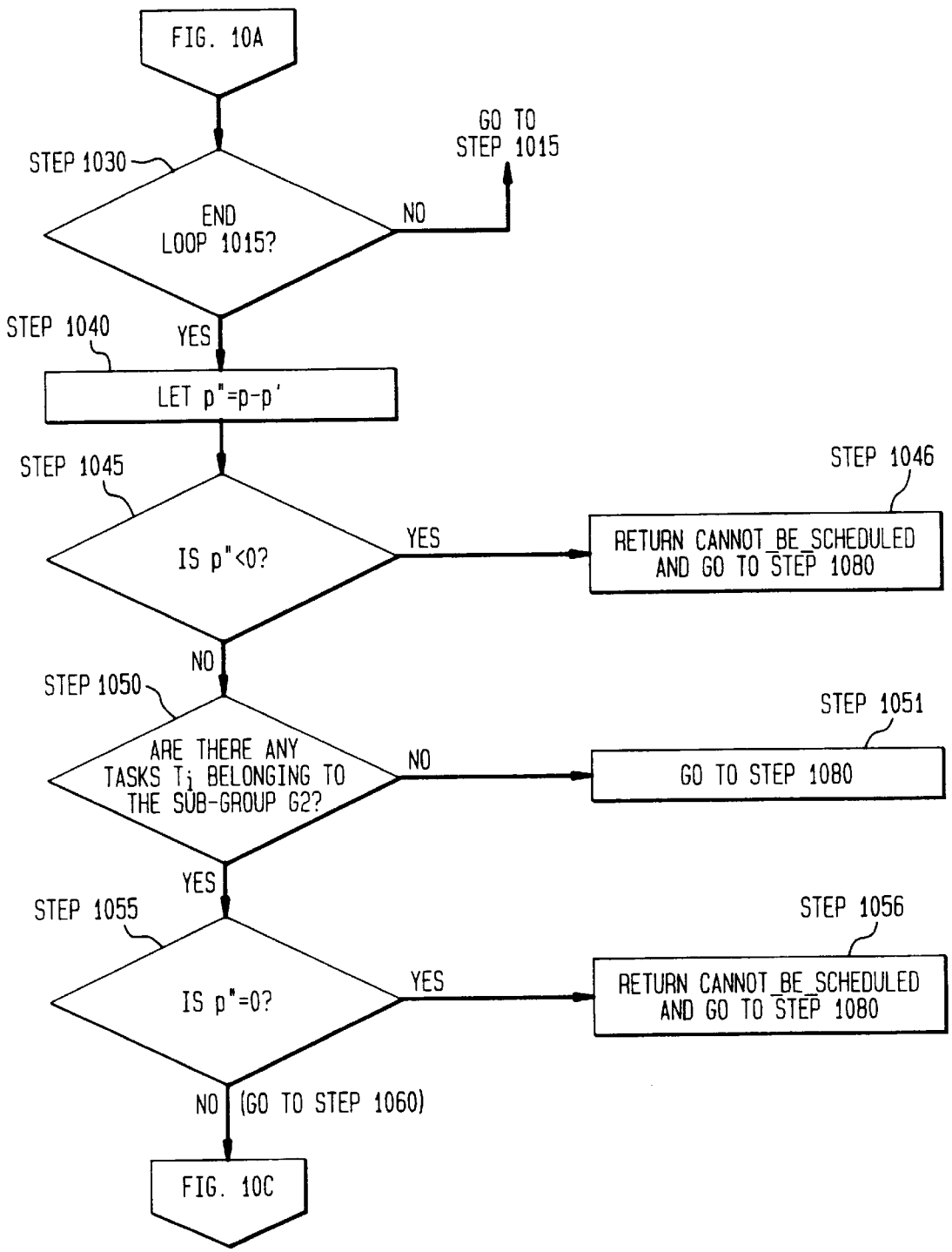

Referring to FIG. 10a to 10c, there is illustrated an exemplary flowchart of the procedure SCHEME_2 for scheduling videos in a service list for a video server employing a first CGS scheme, i.e., scheduling non pre-emptible tasks $T_1, \ldots, T_n$ with $w_i$ number of sub-tasks, each with unit computation times, at periods $P_1, \ldots, P_n$ and intervals F. In step 1000, as shown in FIG. 10a, data corresponding to tasks $T_i$ in group G and a value of p are read into the RAM buffer memory of the video server. The value of p, as applied to the second scheduling scheme and in contrast to the first scheduling scheme, refers to the number of processors required to service one disk. Data for group G includes tasks $T_i$, $w_i$ number of sub-tasks with unit computation times, periods $P_i$ and intervals F, i.e., $\{T_i, w_i, P_i, F\}$. Note that in the first CGS scheme, the interval between any adjacent sub-tasks belonging to the same task is F.

For certain tasks, it may be the case that scheduling a task $T_i$ periodically requires some of its sub-tasks to be scheduled at the same time. As a result, it may not be possible to schedule such a task $T_i$ on a single processor. Example 2 is provided for illustration purposes. Consider a task $T_1$ with period $P_1=4$ and $w_1=3$ at intervals F=6. If the start time $ST_1=0$, then the three sub-tasks for the first stream of $T_1$ are scheduled at rounds 0, 6, and 12, respectively. Since $P_1=4$, the first sub-task for the third stream of $T_1$ needs to be scheduled again at round 12. Thus, there is a conflict at round 12 and task $T_1$ cannot be scheduled on a single processor.

In step 1005, the tasks $T_i$ are categorized according to whether two or more sub-tasks belonging to the same task $T_i$ will conflict, i.e., will be scheduled at the same time. Categorizing of the tasks $T_i$ is performed using the following condition: for a sub-task r and a sub-task s belonging to task $T_i$, determine whether $((r-1)\cdot F) \bmod P_i = ((s-1)\cdot F) \bmod P_i$, where $1 \leq r \leq w_i$, $1 \leq s \leq w_i$, and r s. If this condition is satisfied, sub-tasks r and s will be scheduled at the same time causing a scheduling conflict and thus, task $T_i$ is not scheduleable on a single processor. Tasks not scheduleable on a single processor are categorized in group G1. For a task $T_i$ to be scheduleable on a single processor, the above condition must not be satisfied for any combination of sub-tasks r and s in task $T_i$. Tasks scheduleable on a single processor are categorized in group G2.

In steps 1010 to 1030, SCHEME_2 determines the number of processors needed for tasks $T_i \in$ G1. In step 1010, the value of p', i.e., number of processors required to schedule all the tasks $T_i \in$ G1, is initially set to zero. In step 1015, a loop 1015 is initiated which calculates the $p_i$ number of processors required to schedule each task $T_i \in$ G1. In step 1020, the value $p_i$ for the current task $T_i$ in the loop 1015 is calculated. Specifically, the value $p_i$ depends on the value most frequently yielded by the equation $((r-1)\cdot F) \bmod P_i$ for every sub-task in task $T_i$. The frequency of the most frequently yielded value (by the above equation) for a task $T_i \in$ G1 is the number of processors required for scheduling the task $T_i$. In steps 1025 and 1026, the current value $p_i$ is added to p' and the start time for the current task $T_i$ is set to zero. Applying the equation $((r-1)\cdot f) \bmod P_i$ to example 2, the following values are determined for the three sub-tasks, i.e., r=1, 2 and 3, respectively: 0, 2 and 0. Since the value zero is yielded most frequently for task $T_2$, then the number of processors required for task $T_2$ is equal to the frequency of the value zero, which is two. The value $p_i$ is progressively added to p', in step 1025, for every $T_i \in$ G1 and start times $ST_i$ for tasks $T_i \in$ G1 are set to zero, in step 1026.

As shown in FIG. 10b, upon completing the loop 1015 or if there are no tasks $T_i \in$ G1, SCHEME_2 proceeds to step 1040 where it determines the number of processors available for scheduling tasks $T_i \in$ G2, i.e., the value of p". In step 1045, if the value of p" is less than zero, then there are not enough processors to schedule tasks $T_i \in$ G1 and SCHEME_2 goes to step 1046 where a cannot_be_scheduled statement is returned before going to step 1080 and terminating. Otherwise SCHEME_2 goes to step 1050 where it checks whether there are any tasks $T_i \in$ G2 to schedule. If there are no tasks $T_i \in$ G2, then SCHEME_2 goes to step 1051 where it is instructed to go to step 1080 and stop. Otherwise, SCHEME_2 proceeds to step 1055 where it checks whether there are any processors available for scheduling $T_i \in$ G2. If p"=0, then there are no processors available for servicing the tasks $T_i \in$ G2, and SCHEME_2 goes to step 1056 where a cannot_be_scheduled statement is returned before going to step 1080 and terminating. Otherwise, SCHEME_2 proceeds to step 1060 where it determines whether to partition the sub-group G2 into subsets G2-y. If no partitioning is required, i.e., p"=1, SCHEME_2 sets subset G2-1 equal to sub-group G2 in step 1061, as shown in FIG. 10c. Otherwise, p">0 and SCHEME_2 calls PARTITION to partition the tasks $T_i \in$ G2 into p" number of disjoint subsets G2-y, where y=1, ..., p", in steps 1065 to 1070. Once the tasks $T_i \in$ G2 have been partitioned, SCHEME_2 calls SCHEDULE_TASKS_2 for each subset G2-y, in step 1075, where the second scheduling scheme determines whether the tasks $T_i \in$ G2 are scheduleable on p" number of processors.

Figure 11A:
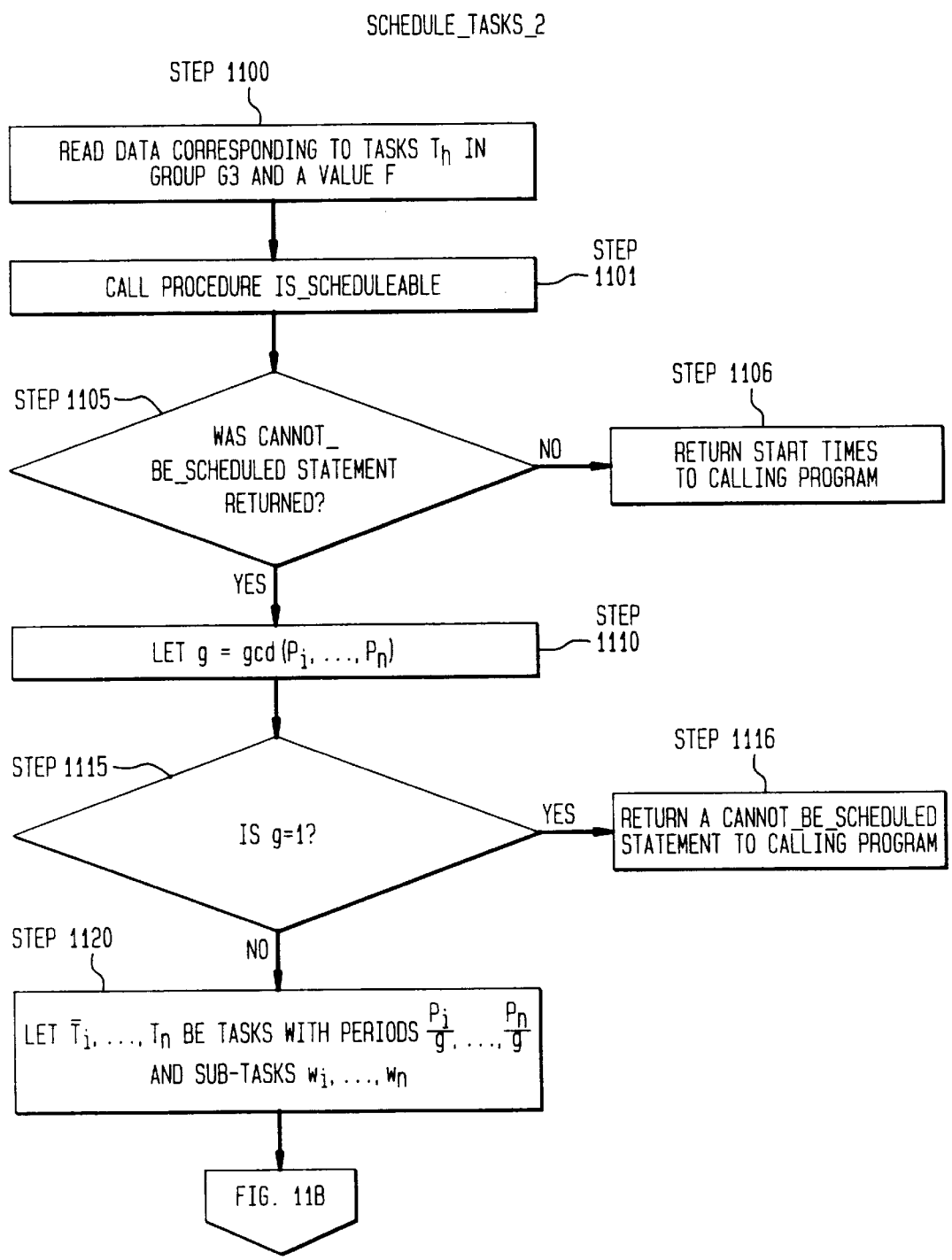
FIGS. 11a to 11b depict an exemplary flowchart of a procedure for scheduling a group of tasks in FIGS. 10a to 10c which are scheduleable on less than one processor.
Figure 11B:
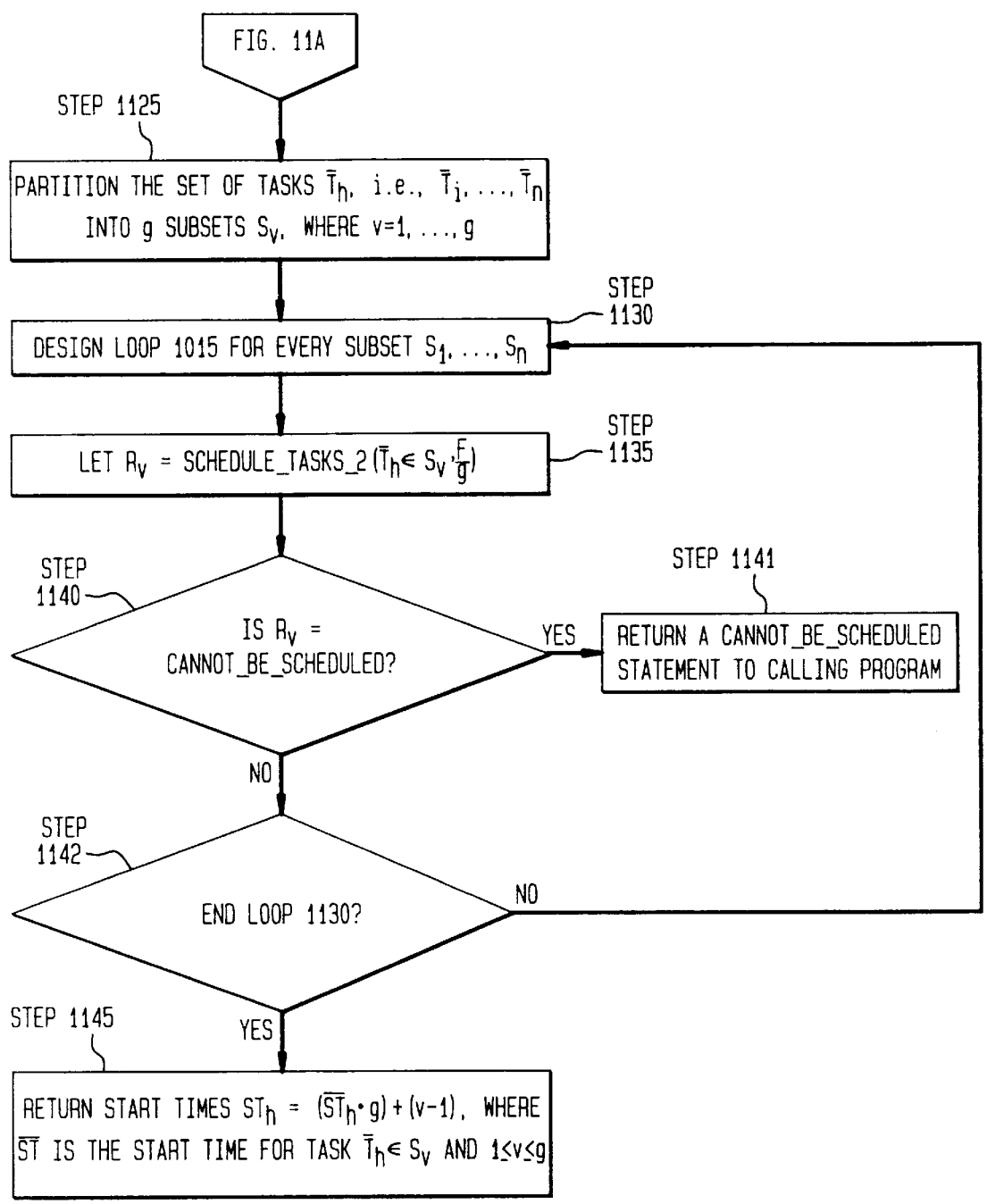

Referring to FIGS. 11a to 11b, there is illustrated an exemplary flowchart of SCHEDULE_TASKS_2. As shown in FIG. 11a, in step 1100, SCHEDULE_TASKS_2 reads data as tasks $T_h$ belonging to group G3 and a value of F. In step 1101, SCHEDULE_TASKS_2 calls the procedure IS_SCHEDULEABLE to determine whether tasks $T_h$ in group G3 are scheduleable. In step 1105, SCHEDULE_TASKS_2 checks if a cannot_be_scheduled statement or a set of start times was returned by the call to IS_SCHEDULEABLE. If a set of start times was returned, then SCHEDULE_TASKS_2 returns the set of start times to the calling program, in step 1106. Otherwise SCHEDULE_TASKS_2 proceeds to steps 1110 to 1135 where SCHEDULE_TASKS_2 recursively partitions the group G3. In step 1110, SCHEDULE_TASKS_2 sets the value of g equal to the greatest common divisor of the periods $P_h$ in the group G3. In steps 1115 to 1135, as shown in FIGS. 11a and 11b, SCHEDULE_TASKS_2 determines whether the group G3 is partitionable, i.e. is g=1, and if group G3 is partitionable, i.e., g>1, SCHEDULE_TASKS_2 recursively partitions the group G3 into subsets $S_v$, where v=1, ..., g, before invoking itself for each subset $S_v$. Note that the data corresponding to tasks $T_h \in$ G3 is transformed from $\{T_h, w_h, P_h, F\}$ to $\{\overline{T}_h, \overline{w}_h, \overline{P}_h, \overline{F}\}$ where $\{\overline{T}_h, \overline{w}_h, \overline{P}_h, \overline{F}\} = \{T_h, w_h, P_h/g, F/g\}$, in step 1120. The steps 1115 to 1135 are similar to the steps 825 to 845 belonging to SCHEDULE_TASKS_1, as shown in FIGS. 8b and 8c.

In steps 1140 to 1145, SCHEDULE_TASKS_2 checks the data returned by the succeeding level invocation of SCHEDULE_TASKS_2 in step 1135. If a cannot_be_scheduled statement was returned by any succeeding level invocation of SCHEDULE_TASKS_2, the current invocation of SCHEDULE_TASKS_2 returns a cannot_be_scheduled statement to its calling program, in step 1141. Otherwise, the current invocation of SCHEDULE_TASKS_2 assumes a set of start times for the tasks $\overline{T}_h$ in each subset $S_v$ were returned by the succeeding level invocation of SCHEDULE_TASKS_2. Accordingly, the current invocation of SCHEDULE_TASKS_2, in step 1145, merges the sets of start times returned by the succeeding level invocations of SCHEDULE_TASKS_2 to obtain start times for the tasks $T_h \in$ G3. The following equation is used to merge the sets of start times: $ST_h = (\overline{ST}_h \cdot g) + (v-1)$, where $\overline{ST}_h$ is the start time for task $\overline{T}_h \in S_v$ and $1 \leq v \leq g$. The merged start times for the tasks $T_h$ are subsequently returned to the calling program.

Figure 12B:
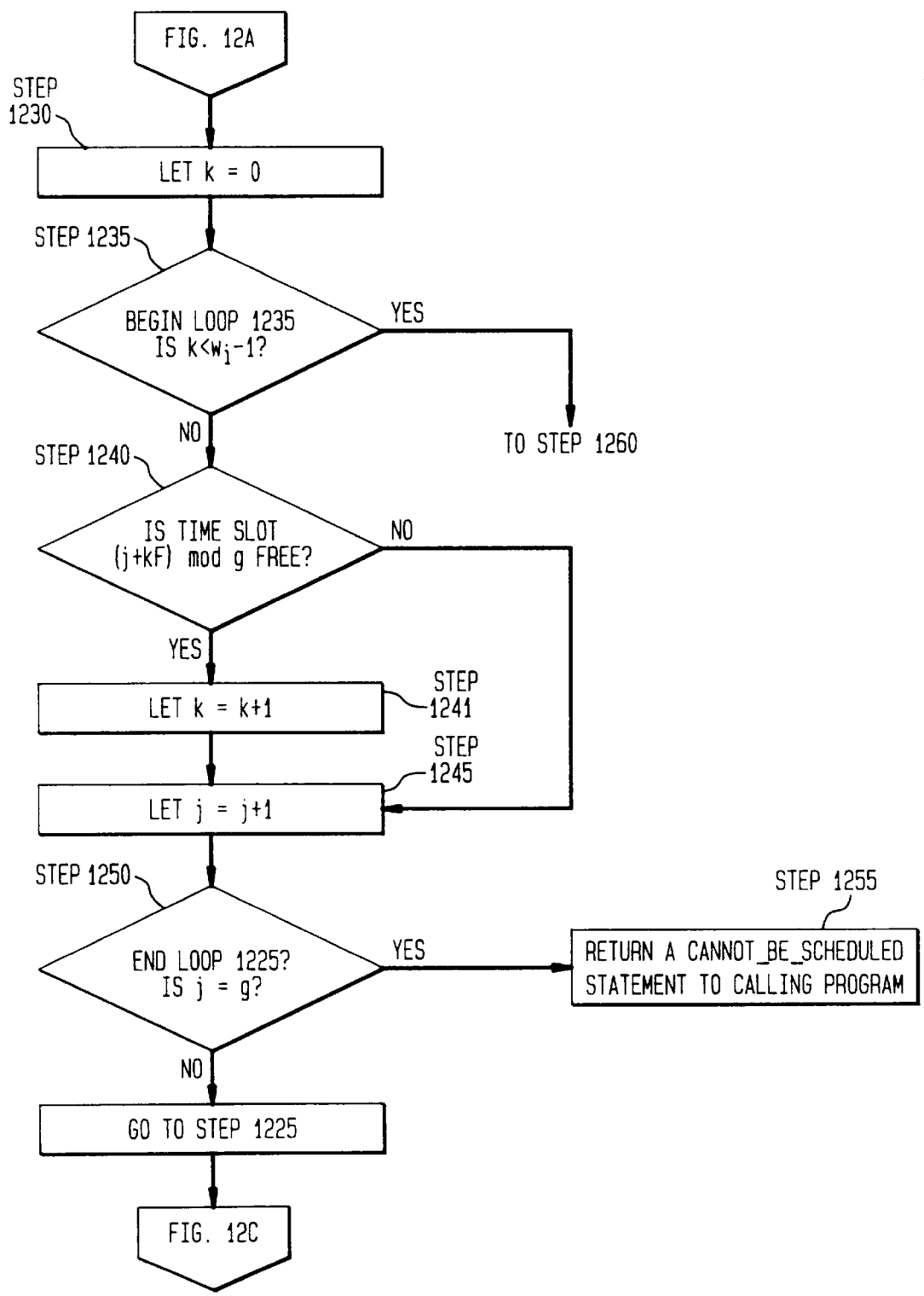
Figure 12C:
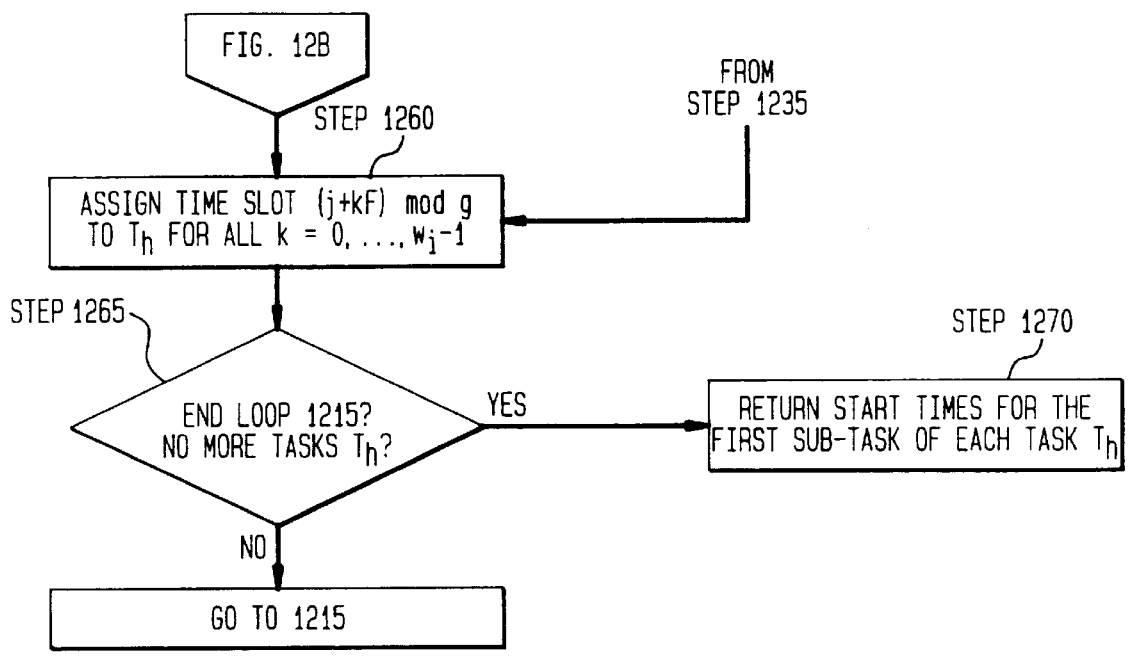

Referring to FIGS. 12a to 12c, there is illustrated an exemplary flowchart of the procedure IS_SCHEDULEABLE which determines scheduleability by creating an array of time slots and attempting to assign sub-tasks to the time slots such that there are no conflicts. As shown in FIG. 12a, in step 1200, IS_SCHEDULEABLE reads data as tasks $T_h$ belonging to group G4 and a value of F. In step 1201, IS_SCHEDULEABLE creates an array having g number of time slots numbered 0 to g−1, where the value of g is equal to the greatest common divisor of the periods in group G4. In step 1205, each time slot is marked free, i.e., the time slots have no sub-tasks assigned to them. In steps 1210 to 1250, IS_SCHEDULEABLE attempts to assign each task $T_h$ and its sub-tasks to the array of time slots such that the following two conditions hold: (1) if a task is assigned to time slot j, then the next sub-task of the task (if it exists) is assigned to time slot (j+F) mod g; and (2) no two sub-tasks belong to distinct tasks are assigned to the same time slot. An assignment of sub-tasks to time slots that satisfies the above two conditions is a valid assignment.

In step 1210, the tasks $T_h \in$ G4 are sorted in descending order according to the $w_h$ number of sub-tasks. In step 1215, a loop 1215 is initiated for each task $T_h \in$ G4. Specifically, the loop 1215 assigns the sub-tasks r for each task $T_h \in$ G2-y, individually in sorted order, to the time slots j of the array created in step 1201, where j=0, . . . ,g−1. In step 1220, the loop 1215 begins by setting the value of j equal to zero so that the time slot 0 is the first time slot to be assigned a sub-task r. In step 1225, a loop 1225 is initiated for every time slot j<g. Specifically, the loop 1225 progressively checks if time slots (j+k·F) mod g, for every sub-task r belonging to the current task $T_h$ of the loop 1215, are free to be assigned the sub-task r, where k=r−1, i.e., k=0, . . . ,$w_h$−1.

As shown in FIG. 12b, in step 1230, the loop 1225 begins by setting k equal to zero so that the first sub-task r of the first task $T_h$ in the sorted order, i.e., task with the largest number of sub-tasks, is assigned to the first time slot 0. In steps 1235 and 1240, a loop 1235 is initiated for every sub-task r (except the first sub-task), i.e., for k<$w_h$−1, to determine whether the sub-tasks r belonging to the current task $T_h$ can be assigned to time slots (j+k·F) mod g for the current value of j in the loop 1225. If IS_SCHEDULEABLE determines that the current sub-task r in the loop 1235 can be successfully assigned to the time slot (j+k·F) mod g for the current value of j in step 1240, then IS_SCHEDULEABLE re-performs the loop 1235 for the next sub-task r with the same value of j. On the other hand, if IS_SCHEDULEABLE determines that the current sub-task r in the loop 1235 cannot be assigned to the time slot (j+k·F) mod g, in step 1240, then IS_SCHEDULEABLE exits the loop 1235 goes to step 1245 where the current value of j is updated to j+1. Subsequently, in step 1250, if IS_SCHEDULEABLE determines the updated current value of j, i.e., j+1, is equal to the value of g, then the loop 1225 is terminated and a cannot_be_scheduled statement is returned to the calling program in step 1255. Otherwise, IS_SCHEDULEABLE goes to step 1225 from step 1250 to determine whether the time slots (j+k·F) mod g for the updated current value of j are free to be assigned sub-tasks r belonging to the current task $T_h$ in the loop 1215.

If the loop 1235 is successfully completed for all the sub-tasks r in the current task $T_h$ of the loop 1215, then IS_SCHEDULEABLE has determined that the corresponding time slots (j+k·F) mod g are free for the current value of j. Accordingly, IS_SCHEDULEABLE goes to step 1260 from step 1235 where the sub-tasks r for the current task $T_h$ are assigned to the time slots (j+k·F) mod g. Subsequently, IS_SCHEDULEABLE is instructed in step 1265 to re-perform the loop 1215 for the next task $T_h$ in the group G4. Upon completing the loop 1215 for every task $T_h \in$ G4 without returning a cannot_be_scheduled statement, IS_SCHEDULEABLE goes to step 1270 and returns to SCHEDULE_TASKS_2 the start times for the first sub-tasks of each task $T_h \in$ G4, in step 1270.

The above description is an exemplary mode of carrying out the present invention. Although the present invention has been described with reference to specific examples and embodiments for periodically scheduling non pre-emptible tasks on video servers, it should not be construed to limit the present invention in any manner to video servers, and is merely provided for the purpose of describing the general principles of the present invention. It will be apparent to one of ordinary skill in the art that the present invention may be practiced through other embodiments.

We claim:

1. A method for scheduling a group of periodically recurring, non pre-emptible tasks on a server, wherein said group of tasks includes a first class of tasks having periods greater than or equal to computation times, said periods (hereafter designated $P_i$) being representative of intervals at which tasks are to begin and said computation times (hereafter designated $C_i$) being representative of run times for said tasks, and further wherein said server has a first sub-group of processors available for processing said first class of tasks, said method comprising the steps of:

partitioning said first class of tasks into one or more disjoint sets; and determining scheduleability of said first class of tasks on said first sub-group of processors based on a function of computation times for said first class of tasks and a greatest common divisor of said periods for tasks in said first class of tasks, wherein said first class of tasks is scheduleable on said first sub-group of processors if each of said disjoint sets is determined to be scheduleable.

2. The method of claim 1 wherein said step of determining scheduleability of said first class of tasks includes the step of:

determining slack values for each of said disjoint sets, wherein a slack value is determined by subtracting a sum of said computation times in a disjoint set from a greatest common divisor of said periods in said disjoint set, said disjoint set being scheduleable on less than one processor if said slack value is non-negative.

3. The method of claim 2 comprising the additional step of:

scheduling a start time for each task in a disjoint set if said disjoint set is determined to be scheduleable.

4. The method of claim 2 wherein each task in said disjoint set is scheduled with a start time equal to a sum of said computation times of previously scheduled tasks if said disjoint set is determined to be scheduleable.

5. The method of claim 1 wherein said step of partitioning said first class of tasks includes the step of:

assigning said tasks to said disjoint sets such that slack values for said disjoint sets are maximized, wherein a slack value is determined by subtracting a sum of said computation times in a disjoint set from a greatest common divisor of said periods in said disjoint set.

6. The method of claim 1 wherein said step of partitioning said first class of tasks includes the steps of:

assigning a first task to a first empty disjoint set, wherein said first task is a task in said first class of tasks which yields a slack value that is less than or equal to any slack value for any other task in said first class of tasks if assigned to said first empty disjoint set, said slack value determined by subtracting a sum of said computation times in a disjoint set from a greatest common divisor of said periods in said disjoint set;

assigning an unassigned task in said first class of tasks to an empty disjoint set such that said unassigned task yields a slack value less than or equal to any slack value for any other unassigned task in said first class of tasks if assigned to any non-empty disjoint set;

repeating said step of assigning said unassigned task until no empty disjoint sets remain;

designating an unassigned or non-designated task in said first class of tasks to a non-empty disjoint set such that said non-empty disjoint set to which said unassigned or non-designated task is designated is a disjoint set which yields a maximum slack value if said unassigned or non-designated task is designated to any other non-empty disjoint set; and repeating said step of designating an unassigned or non-designated task until every task in said first class of tasks has been assigned or designated.

7. The method of claim 1 wherein said first sub-group of processors have p" number of processors and said first class of tasks is partitioned into p" or less number of disjoint sets if p" is greater than one.

8. The method of claim 7 wherein said first class of tasks are determined to be scheduleable on said first sub-group of processors if each of said disjoint sets is determined to be scheduleable on less than one processor.

9. The method of claim 1 wherein said step of partitioning said first class of tasks includes the step of:
   determining whether said first class of tasks is further partitionable into more than one disjoint set.

10. The method of claim 9 wherein said step of determining whether said first class of tasks is partitionable includes the step of:
    determining a value C for said first class of tasks such that said value C is a minimum value which is greater than or equal to each computation time in said first class of tasks and said value C divides evenly into each period in said first class of tasks, wherein said first class of tasks is determined not further partitionable if said value C cannot be determined.

11. The method of claim 10 wherein said step of determining whether said first class of tasks is partitionable includes the step of:
    computing a value g for said first class of tasks by dividing said value C into said greatest common divisor of said periods in said first class of tasks, wherein said first class of tasks is determined further partitionable if said value g is greater than one and not further partitionable if said value g is equal to one.

12. The method of claim 11 wherein said step of partitioning said first class of tasks includes the step of:
    partitioning said first class of tasks having periods $P_i$ and computation times $C_i$ into g number of disjoint sets of tasks having periods $P_i/g$ and computation times $C_i$.

13. The method of claim 1 wherein said step of determining scheduleability of said first class of tasks includes the steps of:
    computing a value g for each of said disjoint sets by dividing a value C into said greatest common divisors of said periods in each of said disjoint sets, wherein said value C is a minimum value which is greater than or equal to each computation time in a disjoint set and said value C divides evenly into each period in said disjoint set; and
    packing said tasks in said disjoint set into g number of bins according to said computation times of said tasks being packed.

14. The method of claim 13 wherein said step of packing said tasks includes the steps of:
    sorting said tasks in said disjoint set in descending order according to said computation times; and
    assigning a task individually in sorted order to a bin having a minimum sum of said computation times of previously assigned tasks for all bins.

15. The method of claim 14 wherein said step of determining scheduleability of said first class of tasks includes the step of:
    calculating whether sums of said computation times in each of said bins is greater than or equal to said value C, wherein said disjoint set is scheduleable if said sums of said computation times in each of said bins is greater than or equal to said value C.

16. The method of claim 15 comprising the additional step of:
    scheduling start times for said tasks in said disjoint set according to said bins and position of said tasks in said bins.

17. The method of claim 16 comprising the additional step of:
    merging said start times for said tasks in said disjoint sets to obtain start times for said tasks in said first class of tasks.

18. The method of claim 1 wherein said group of tasks includes a second class of tasks with said computation times $C_i$ greater than said periods $P_i$, said server having a second sub-group of p' number of processors available for processing said second class of tasks, said method comprising the additional step of:
    calculating a number of processors required by each task in said second class of tasks using a smallest integer greater than $P_i/C_i$ for each said task in said second class of tasks.

19. The method of claim 18 comprising the additional step of:
    scheduling a predetermined start time for each task in said second class of tasks.

20. The method of claim 1 wherein said server is a video server for servicing tasks corresponding to videos.

21. A server for servicing periodically recurring tasks, having periods (hereafter designated $P_i$) and computation times (hereafter designated $C_i$) wherein said server includes a first sub-group of processors, said server comprising:
    means for partitioning a first class of tasks into one or more disjoint sets, wherein said first class of tasks have said periods $P_i$ that are greater than or equal to their respective computation times $C_i$; and
    means for determining scheduleability of said first class of tasks on said first sub-group of said processors using greatest common divisor of said periods within said first class of tasks.

22. The server of claim 21 wherein said means for determining scheduleability includes:
    means for determining slack values for each of said disjoint sets, wherein a slack value is determined by subtracting a sum of said computation times in a disjoint set from a greatest common divisor of said periods in said disjoint set.

23. The server of claim 21 wherein said means for partitioning includes:
    means for assigning said tasks to said disjoint sets such that slack values for said disjoint sets are maximized, wherein a slack value is determined by subtracting a sum of said computation times in a disjoint set from a greatest common divisor of said periods in said disjoint set.

24. The server of claim 21 wherein said means for determining scheduleability includes:
    means for computing a value g for each of said disjoint sets by dividing a value C into said greatest common divisors of said periods in each of said disjoint sets, wherein said value C is a minimum value which is greater than or equal to each computation time in a disjoint set and said value C divides evenly into each period in said disjoint set; and
    means for packing said tasks in a disjoint set into g number of bins according to said computation times of said tasks being packed.

25. The server of claim 24 wherein said means for packing said tasks includes:
    means for sorting said tasks in said disjoint set in descending order according to said computation times; and
    means for assigning a task individually in sorted order to a bin having a minimum sum of said computation times of previously assigned tasks for all bins.

26. The server of claim 25 wherein said means for determining scheduleability includes:

means for calculating whether sums of said computation times in each of said bins is greater than or equal to said value C, wherein said disjoint set is scheduleable if said sums of said computation times in each of said bins is greater than or equal to said value C.

27. The server of claim 21 further comprising:

means for scheduling start times for tasks in said first class of tasks if said means for determining scheduleability of said first class of tasks determines said first class of tasks to be scheduleable on said first sub-group of processors.

28. The server of claim 21 further comprising:

means for calculating a number of processors to service a second class of tasks using a smallest integer greater than $P_i/C_i$ for each said task in said second class of tasks, wherein said second class of tasks have said period $P_i$ that are less than their respective computation times $C_i$.

29. The server of claim 21 wherein said server is a video server for servicing tasks corresponding to video programming.

* * * * *